United States Patent
Cormie et al.

(10) Patent No.: US 8,954,592 B1
(45) Date of Patent: Feb. 10, 2015

(54) DETERMINING COMPUTING-RELATED RESOURCES TO USE BASED ON CLIENT-SPECIFIED CONSTRAINTS

(75) Inventors: John Cormie, Seattle, WA (US);
Vishesh Khemani, Seattle, WA (US);
David R. Richardson, Seattle, WA (US);
Luis Felipe Cabrera, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 1531 days.

(21) Appl. No.: 11/963,590

(22) Filed: Dec. 21, 2007

Related U.S. Application Data

(60) Provisional application No. 60/985,567, filed on Nov. 5, 2007.

(51) Int. Cl.
*G06F 15/16* (2006.01)
*H04L 29/08* (2006.01)
*H04L 12/911* (2013.01)
*G06F 9/50* (2006.01)
*H04L 12/24* (2006.01)

(52) U.S. Cl.
CPC ........ *H04L 67/1021* (2013.01); *H04L 67/1008* (2013.01); *H04L 41/5006* (2013.01); *H04L 47/70* (2013.01); *G06F 9/5083* (2013.01); *H04L 41/0893* (2013.01); *H04L 41/18* (2013.01)
USPC ............................ 709/229; 709/225; 709/226

(58) Field of Classification Search
CPC ..... H04L 47/70; H04L 41/0893; H04L 41/18; H04L 41/5006; H04L 67/1021; H04L 67/1008; G06F 9/5083
USPC .................................. 709/226, 218, 225, 229
See application file for complete search history.

(56) References Cited

U.S. PATENT DOCUMENTS

| | | | | |
|---|---|---|---|---|
| 6,038,445 A | * | 3/2000 | Alperovich et al. | 455/432.1 |
| 7,792,944 B2 | * | 9/2010 | DeSantis et al. | 709/223 |
| 8,584,131 B2 | * | 11/2013 | Wong et al. | 718/104 |
| 8,799,039 B2 | * | 8/2014 | Cullen, III | 705/7.11 |
| 2002/0065907 A1 | * | 5/2002 | Cloonan et al. | 709/223 |

(Continued)

OTHER PUBLICATIONS

AmazonWebServices; "Amazon Simple Storage Service Developer Guide"; Mar. 2006; API Version; pp. 1-187.*
"Introduction to DCE," IBM Corporation, retrieved Oct. 19, 2007, from http://www-306.ibm.com/software/network/dce/library/publications/dceaix_22/a3u2s/A3U2SM2 . . . , 7 pages.

(Continued)

*Primary Examiner* — Oleg Survillo
(74) *Attorney, Agent, or Firm* — Seed IP Law Group PLLC

(57) ABSTRACT

Techniques for facilitating a client's control over use of computing-related resources on the client's behalf. In some situations, a client's control is based on specifying a group of one or more resource usage constraints with a client resource constraint manager service, which provides information about the client-specified constraints to one or more other remote network services with which the client interacts. Those remote services then use that constraint information to determine whether and how to use computing-related resources on the client's behalf. For example, the resource usage constraints specified by a client may relate to one or more particular geographical areas and/or to one or more measures of relative proximity between computing-related resources (e.g., between multiple instances of a single type of computing-related resource provided by a single service, or between multiple distinct types of computing-related resources provided by multiple unaffiliated services).

25 Claims, 9 Drawing Sheets

(56) References Cited

U.S. PATENT DOCUMENTS

| | | | |
|---|---|---|---|
| 2004/0162901 A1* | 8/2004 | Mangipudi et al. | 709/225 |
| 2006/0048157 A1* | 3/2006 | Dawson et al. | 718/104 |
| 2006/0206440 A1* | 9/2006 | Anderson et al. | 705/500 |
| 2006/0206619 A1* | 9/2006 | Dan et al. | 709/233 |
| 2009/0055473 A1* | 2/2009 | Synnergren | 709/204 |
| 2010/0153863 A1* | 6/2010 | Cullen, III | 715/760 |
| 2014/0047119 A1* | 2/2014 | Wong et al. | 709/226 |

OTHER PUBLICATIONS

"Interview with Patrick Harr, CEO for Nirvanix," socalTECH.com, Sep. 20, 2007, retrieved Oct. 19, 2007, from http://www.socaltech.com/interview_with_patrick_harr_ceo_of_nirvanix/s-0011327.html, 4 pages.

"Nirvanix Launches to Compete With Amazon S3 Storage Service," Sep. 5, 2007, retrieved Oct. 19, 2007, from http://www.techcrunch.com/2007/09/05/nirvanix-launches-to-compete-with-amazon-s3-storage-s . . . , 8 pages.

* cited by examiner

DETERMINING COMPUTING-RELATED RESOURCES TO USE BASED ON CLIENT-SPECIFIED CONSTRAINTS

CROSS REFERENCE TO RELATED APPLICATIONS

This application claims the benefit of provisional U.S. Patent Application No. 60/985,567, filed Nov. 5, 2007 and entitled "Determining Computing-Related Resources To Use Based On Client-Specified Constraints," which is hereby incorporated by reference in its entirety.

TECHNICAL FIELD

The following disclosure relates generally to facilitating client control over use of computing-related resources based at least in part on constraints specified by the client.

BACKGROUND

As the use of the Internet and the World Wide Web ("Web") has become widespread, it is increasingly common for users to access and use various types of capabilities provided by remote computing systems over the Web, including to search for, shop for and order items (such as products, services and/or information) that are for purchase, rent, lease, license, trade, evaluation, sampling, subscription to, etc. In addition to such user-initiated interactions, software programs on remote computing systems may also interact for various purposes and in various ways. For example, there is growing use of the Web to provide so-called "Web services," which typically involve the programmatic interaction of remote applications to exchange information via defined APIs ("application program interfaces"). Web services allow heterogeneous applications and computers to interact, and may be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. Such URI-based invocation requests may, for example, be based on the use of XML over HTTP (e.g., as part of the REpresentational State Transfer, or "REST", distributed interaction model that focuses on resources). In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

While capabilities provided by services over networks to remote users and other clients have various benefits, various problems also exist. For example, as the scale of such offerings increases (e.g., to support large numbers of clients), large numbers of computing devices may become available throughout the world to store data related to the clients and/or to handle requests from and other interactions with the clients. However, among other potential issues, it can be difficult to manage the storage of data and to coordinate the various computing devices in such situations in order to provide desired behavior.

DETAILED DESCRIPTION

Figure 1:
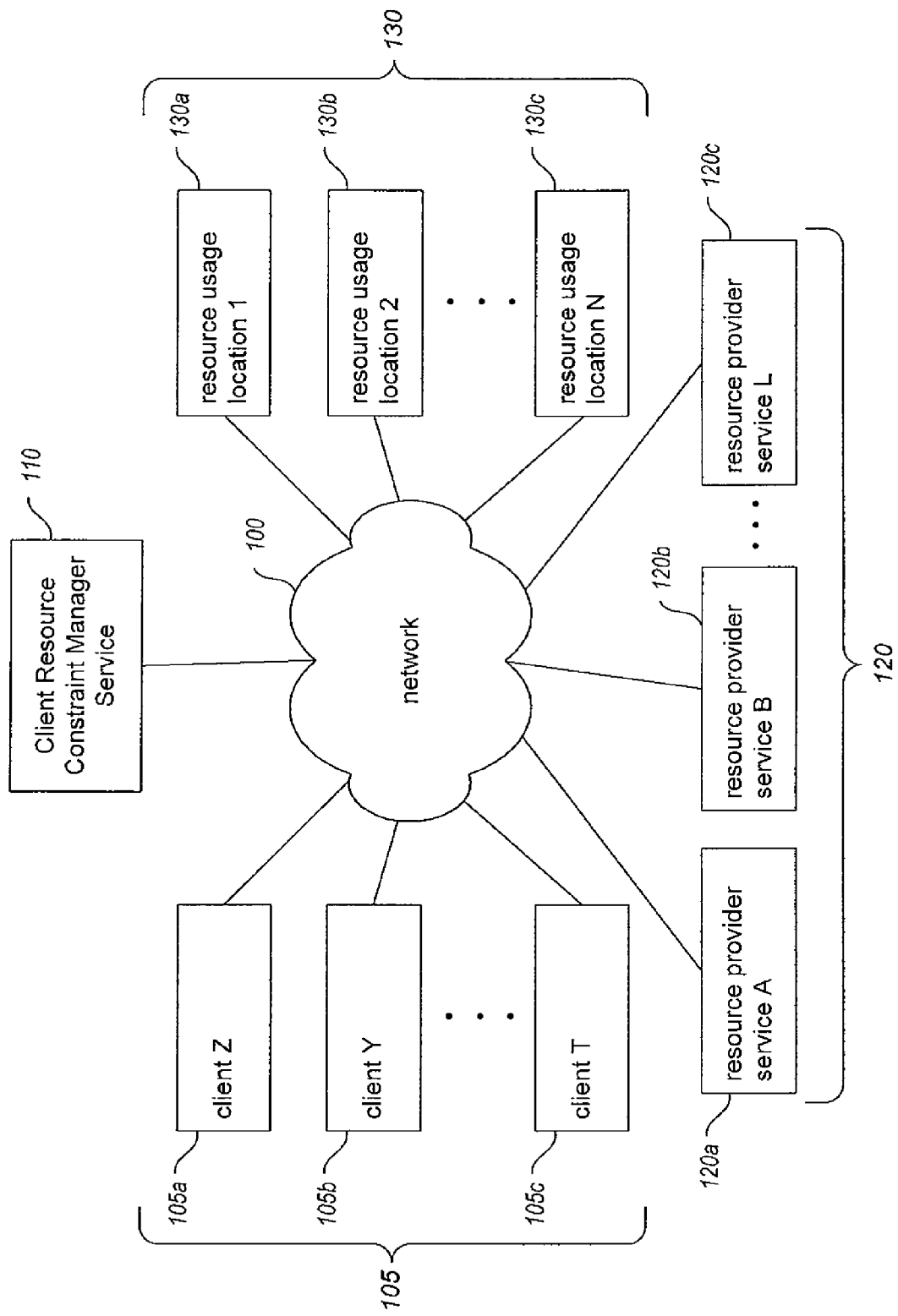
FIG. 1 is a network diagram illustrating an example embodiment in which clients, services, and computing-related resources interact via a network.

Techniques are described for, among other things, facilitating a client's control over use of computing-related resources on the client's behalf. In at least some embodiments, a client's control of the use of computing-related resources is based at least in part on one or more constraints specified by the client, such as based on interactions by the client with an embodiment of a Client Resource Constraint Manager Service that provides capabilities related to the specification and use of client-specified constraints. After a client has specified one or more such resource usage constraints, other services with which the client interacts (e.g., remote services over a network) may obtain information about the specified constraints from the Client Resource Constraint Manager Service, and then use that constraint information to determine whether and how to use computing-related resources on behalf of the client. For example, in at least some embodiments, the resource usage constraints specified by a client may relate to one or more particular geographical areas and/or to one or more measures of relative proximity between computing-related resources (e.g., between multiple instances of a single type of computing-related resource provided by a single service, or between multiple distinct types of computing-related resources provided by multiple unaffiliated services), such that particular services may determine a particular geographical location at which to use computing-related resources on the client's behalf in accordance with those client-specified constraints. In at least some embodiments, at least some of the described techniques are automatically performed by an embodiment of the Client Resource Constraint Manager Service, as described in greater detail below.

In at least some embodiments, various Web services or other network services may each provide one or more types of functionality to remote clients over one or more networks, and as part of providing that functionality may each use one or more types of computing-related resources on behalf of their clients. Such network services may generally be referred to as "resource provider network services" or "resource provider services" in at least some embodiments, as discussed below, such as to reflect that such a service may provide a client with access to use one or more computing-related resources and/or with access to results from or other benefits from using one or more computing-related resources on the client's behalf.

The described techniques may facilitate client control over the use of various types of computing-related resources in various embodiments. A non-exclusive list of examples of types of computing-related resources that may be used on clients' behalf by resource provider services include the following: persistent data storage capabilities (e.g., on non-volatile memory devices, such as hard disk drives); temporary data storage capabilities (e.g., on volatile memory, such as RAM); program execution capabilities (e.g., for a software program provided by a client, such as a client-specific virtual machine image to be executed on one of multiple virtual machines supported by one or more physical computing systems; for a software program made available by a resource provider service to a client for use by the client; for a software program used by a resource provider service on behalf of a client, such as to manipulate the client's data; etc.); message queuing and/or passing capabilities; other types of communication capabilities (e.g., network sockets, virtual communication circuits, etc.); database management capabilities; dedicated bandwidth or other network-related resources; input device capabilities; output device capabilities; etc. In addition, at least some such resource provider services may each have access to multiple alternative instances of a particular type of computing-related resource that the service may use on behalf of clients, such as for a particular resource provider service to provide storage-related capabilities using multiple computing systems at multiple distinct geographical locations (e.g., using multiple data centers in different countries or other geographical areas, with one or more of the numerous computing systems in each data center being available to provide storage for the resource provider service).

As one illustrative example, a particular storage-related resource provider service may provide functionality to remote clients to act as a network storage device, such as to allow online backup of the client's locally stored data and/or to provide storage for large collections of data (e.g., photos, video, music, etc.). In such a situation, the storage-related resource provider service may provide and use a selected amount of storage space as a computing-related resource for each client, such as via portions of the hard disk drives of one or more computing systems in one or more geographical locations, or alternatively on other types of storage mediums (e.g., magnetic tape, optical disk or tape, flash memory, etc.) and/or devices and configurations (e.g., as part of a network storage device, storage area network, distributed database, etc.). In addition, at least some resource provider services that provide functionality to remote clients may provide capabilities in addition to the use of underlying computing-related resources, such as to analyze or manipulate stored data in particular ways. For example, to continue the prior illustrative example, a distinct second resource provider service may provide functionality to remote clients to enable image editing and other manipulation capabilities, and in so doing may provide and use a selected amount of storage space as a computing-related resource for each client (e.g., temporarily while performing the editing and manipulation operations). The second resource provider service may, for example, access client images that are permanently stored by the client on a client's local computing device, or in some embodiments may interact with the first storage-related resource provider service (e.g., as directed and authorized by the client) to retrieve and use images of the client that are stored by the first storage-related resource provider service, even if the second resource provider service is unaffiliated with the first storage-related resource provider service. Additional details related to computing-related resources and their use are included below.

Clients may specify and use a variety of types of computing-related resource usage constraints in various embodiments, and such constraints may take a variety of forms. For example, in at least some embodiments, at least some of the constraints may specify or otherwise relate to one or more particular geographical locations or geographical areas, such that use of computing-related resources by one or more resource provider services in accordance with those constraints are restricted to occur (or to not occur) in those particular geographical locations or areas. A geographical location may indicate, for example, a city, a neighborhood, the location of a particular data center with multiple computing systems, the location of a particular computing system, a particular address, etc. A geographical area may, for example, include multiple geographical locations, such as by indicating a country, a state, a region that includes multiple affiliated countries and/or states (e.g., the European Union, the Pacific Northwest area of the United States, etc.), an area covered by a zip code, an area covered by a telephone area code, an area bounded by specified GPS coordinates or other location identifications, an area under the authority of a particular legal entity such as a taxing authority or legislative body that may enact one or more laws covering the area (e.g., privacy-related laws, government-specified restrictions on use of data, etc.) or other governmental authority, etc.

In addition, in at least some embodiments, at least some of the constraints may specify or otherwise relate to a particular relative location description (e.g., that reflects a particular type or degree of proximity to one or more indicated entities of interest), such that use of computing-related resources by one or more resource provider services in accordance with those constraints are restricted to occur (or to not occur) at a location or within a geographical area that satisfies the relative location description. For example, a group of one or more constraints related to one or more relative locations may be specified and used by resource provider services such that all computing-related resources that are used in accordance with the group of constraints are within a specified distance or other proximity from each other (and, if an entity of interest other than those resources is specified, within a specified distance or other proximity from that entity of interest), even if the various computing-related resources are provided and/or used by multiple unaffiliated resource provider services. A proximity or other relative location may be specified in various ways in various embodiments, including the following: a location specified to be within a defined geographical distance from a point of interest (e.g., a particular computing-related resource of interest); a defined proximity-related geographical distance or other size of a geographical area in which all corresponding computing-related resources are to be located; a proximity that is based or measured in a manner other than on geographical distance, such as to reflect a specified maximum degree of latency for network communications between the relative location(s) and/or the indicated entity of interest, a specified minimum amount of bandwidth between the relative location(s) and/or the indicated entity of interest, a specified amount of fault tolerance between the relative location(s) and/or the indicated entity of interest, etc.

In addition, in at least some embodiments, various resource usage constraints may be specified and used that are not related to geographical locations or relative locations. As previously noted, in some embodiments, constraints related to fault tolerance may be specified to facilitate client control over the use of computing-related resources. In some embodiments, such constraints may be specified based on one or more degrees of proximity, such as based on an indication of a relative degree of distance between particular locations, computing-related resources, etc. For example, using such constraints may allow clients to use multiple redundant or otherwise alternative computing-related resources in various manners, and a particular degree of fault tolerance may be desired so that all of the alternative computing-related resources do not fail for the same reason or based on the same event. As one specific example, constraints related to fault tolerance may be based on a level of risk for a disaster occurring in a particular area and/or location (e.g., earthquake zones, flood zones, wildfire zones, tornado zones, hurricane zones, etc.), such as to allow clients to control the use of computing-related resources on the basis of such risks (e.g., so that all of multiple alternative computing-related resources are not used within the same risk area). In addition, in some embodiments, such constraints related to fault tolerance may be based at least in part on computing systems that provide the computing-related resources, such as to ensure a sufficient diversity in types of hardware (e.g., based on the hardware's manufacturer, version, configuration, etc.) and/or software (e.g., such as a particular operating system, version, etc.). Thus, for example, constraints related to fault tolerance may indicate that particular hardware and/or software should or should not be used in particular circumstances.

A non-exclusive list of examples of types of computing-related resource usage constraints that may be specified by a client include the following: a constraint related to one or more desired geographical locations of one or more computing-related resources (e.g., a particular geographical location; a particular geographical area covering one or more geographical locations; etc.); a constraint related to one or more relative locations, such as may be based on proximity to another indicated entity of interest; a constraint related to a price of use of a resource; a constraint related to a time of use of a resource; a constraint related to a type of computing-related resource that may be used or not used; a constraint related to characteristics and/or capabilities of a particular computing system or other computing-related resource (e.g., related to memory, processor, disk space, etc.); a constraint related to a purpose of and/or type of use of a computing-related resource; etc. In addition, at least some constraints may be conditional based on current conditions at a time of the use of the constraint, such as to only apply at indicated times or when used in indicated locations. Additional details related to client-specified constraints and their use are included below.

As previously noted, in at least some embodiments, an end-user client may interact with a remote embodiment of a Client Resource Constraint Manager Service (also referred to in some embodiments as a "constraint manager service" or "constraint manager network service") in order to specify a group of one or more computing-related resource usage constraints, such as in an interactive manner. After the group of one or more such constraints have been defined by a client, the client may interact with one or more other remote resource provider services, such as via one or more client applications that execute on a local computing device of the end-user client and access functionality of the remote resource provider services via APIs of the remote resource provider services. The other remote resource provider services may, for example, be unaffiliated with the Client Resource Constraint Manager Service, but may each be directed by the client to obtain information about the specified constraints from the Client Resource Constraint Manager Service, as discussed in greater detail below. After the other remote resource provider services obtain information about the specified constraints, each of the resource provider services may then use that information to determine whether and how to use computing-related resources on behalf of the client. In other embodiments, a resource provider service may obtain information about the constraints of a client's constraint group in manners other than retrieving that information from an embodiment of the Client Resource Constraint Manager Service, such as if the client provides the constraint information to the resource provider service and/or if the constraint information is provided to the resource provider service by another entity (e.g., by the Client Resource Constraint Manager Service, by another resource provider service, etc.).

In some embodiments, a group of one or more resource usage constraints for a client may be mapped to one or more particular target geographical locations that satisfy the constraints of the group, such as to select one of multiple possible geographical locations that each satisfy the constraints of the group to be the mapped location. When such a mapping to one or more associated target geographical locations exists for a client's constraint group, some or all of the resource provider services that operate on the client's behalf in accordance with that constraint group will then use computing-related resources on the client's behalf in those mapped target geographical locations. In addition, if multiple possible geographical locations are available that each satisfy a client's constraint group, one of the possible geographical locations may be selected so as to not only satisfy the client's constraint group, but to further satisfy one or more objectives for one or more resource provider services that use computing-related resources on the client's behalf in accordance with the constraint group. For example, a particular geographical location may be selected from multiple possible geographical locations that satisfy a client's constraint group, and/or a particular computing system may be selected from multiple possible computing systems that satisfy a client's constraint group, in such a manner as to enhance one or more operating characteristics of the computing-related resources that are used (e.g., to distribute a load among computing-related resources by increasing use of under-utilized computing-related resources at the selected geographical location and/or from a selected computing system, by decreasing use of over-utilized computing-related resources at a non-selected geographical location and/or from a non-selected computing system, etc.). In addition, a geographical location may be selected from multiple possible location based on use of computing-related resources at the selected geographical location having lower costs, improved performance, and/or other benefits. Similarly, a computing system may be selected from multiple possible computing systems based on use of computing-related resources provided by the selected computing system having lower costs, improved performance, and/or other benefits. Furthermore, in at least some embodiments, a client may be unaware of the one or more particular target geographical locations and/or particular computing systems to which the client's constraint group is matched, such as to enable a mapped target geographical location or mapped target computing system for a client's constraint group to be changed without impacting the client.

As discussed in greater detail below, the determination of which target geographical location to map to a particular group of constraints for a client may be performed in various ways in various embodiments, including by the client resource constraint manager service, by a single one of the resource provider services that use the constraint group (e.g., by the first resource provider service that uses the constraint group, by the most recent resource provider service that uses the constraint group, etc.), by multiple or all of the resource provider services that use the constraint group (e.g., based on negotiation or other agreement by those resource provider services), etc. For example, in at least some embodiments, a particular resource provider service may have access to computing-related resources at multiple geographical locations that each satisfy a constraint group of the client, and may be allowed to initially select one of those geographical locations (e.g., a particular data center at that initial geographical location) to which the constraint group will be mapped, such that the resource provider service will initially use one or more computing-related resources on the client's behalf at the initial geographical location. At a later time, the resource provider service may determine that it is preferable to switch the use of computing-related resources for the client from the initial location to another of the available geographical locations that also satisfies the constraint group (e.g., to another data center in a different second location, such as due to the initial data center becoming over-utilized), whether for continuing use of the same resources (e.g., to move a particular set of stored data that is being maintained for the client from storage at the first location to storage at the second location) and/or for new use of related resources (e.g., to store any new data that is provided by the client at the second location). The ability of a resource provider service to initially select and/or change the mapped target geographical location for a constraint group may be restricted or controlled in various ways in at least some embodiments, such as by the Client Resource Constraint Manager Service and/or based on how or whether the change may affect other resource provider services, as discussed in greater detail below.

As previously noted, in at least some embodiments, various resource provider services may each provide one or more types of functionality to clients (e.g., to remote clients over one or more networks), and as part of providing that functionality may each use one or more types of computing-related resources on behalf of their clients. FIG. 1 is a network diagram that illustrates an example embodiment in which clients, resource provider services, and computing-related resources are interacting over one or more networks, with a number of clients interacting with an illustrated embodiment of a Client Resource Constraint Manager Service to control use of computing-related resources by remote resource provider services on the clients' behalf. In particular, the illustrated example includes a number of example clients 105a-105c that may each be interacting with one or more example resource provider services 120a-120c and with an example embodiment of a Client Resource Constraint Manager Service 110 over a network 100. The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet.

In some embodiments, clients 105a-105c may each include one or more applications that execute on a computing device of an end-user and interact with remote resource provider services on behalf of the end-user, such as via APIs provided by the resource provider services. For example, client Z 105a may include one or more applications accessing remote resource provider services on behalf of an end-user Z (not shown). Similarly, client Y 105b and client T 105c may each include one or more applications accessing remote resource provider services on behalf of an end-user Y (not shown) and an end-user T (not shown), respectively. A client application used by an end-user client may include, for example, software that is specific to one or more particular resource provider services and that is provided by those resource provider services for use by clients interacting with the resource provider services, or may instead include software that is not specific to particular resource provider services and may be used to interact with various remote resource provider services (e.g., based on an end-user using a Web browser application).

The example resource provider services 120 include several resource provider services available for use by the clients 105, and the resource provider services may each provide functionality that includes use of one or more computing-related resources. In particular, in the illustrated embodiment, each of the resource provider services may have access to one or more computing-related resources of one or more types at one or more geographical locations, referred to generally as "resource usage locations" with respect to FIG. 1. In particular, FIG. 1 illustrates various resource usage locations 130 (e.g., to each correspond to a distinct geographical location), which are accessible to the resource provider services 120 and the clients 105 via the network 100. For example, resource usage locations 130a, 130b, and 130c may represent one or more computing-related resources located in the Western United States, Eastern United States, and Europe, respectively, and each include at least one computing-related resource that is available for use by at least one of the resource provider services 120. As one example, one of the resource usage locations 130 may represent a data center with multiple physical computing systems, another of the resource usage locations 130 may represent multiple nearby data centers (e.g., that are inter-connected with one or more dedicated high-speed data links or connections), and another of the resource usage locations 130 may represent a single physical computing system.

The illustrated embodiment of the Client Resource Constraint Manager Service 110 in FIG. 1 performs at least some of the described techniques in order to facilitate control by clients 105 over use of computing-related resources located at resource usage locations 130 by resource provider services 120. For example, as described in greater detail with respect to FIGS. 2A-2D, one of the clients 105 may interact with the Client Resource Constraint Manager Service 110 in order to specify a group of one or more resource usage constraints. When that client later interacts with one or more of the resource provider services 120, the client may instruct or otherwise request that each of the resource provider services 120 use computing-related resources on behalf of the client in accordance with the specified constraint group of the client. For example, in some embodiments, the client's specified constraint group may be mapped to one or more of the resource locations 130, and if so each of the resource provider services may perform their use of resources on the client's behalf at one of those mapped resource locations 130 and otherwise in accordance with the constraints of the constraint group. In this manner, a particular client may be able to, for example, ensure that resource usage performed for the client occurs in a particular specified geographical area (e.g., at one or more resource locations 130 within that geographical area), and that computing-related resources of multiple types from multiple resource provider services are used with a specified degree of proximity of each other. In some embodiments, the Client Resource Constraint Manager Service 110 may be provided by a single entity (e.g., a commercial organization) that also provides one or more of the remote resource provider services 120, while in other embodiments, some or all of the remote resource provider services 120 may be unaffiliated with each other and/or with the Client Resource Constraint Manager Service 110.

For illustrative purposes, some embodiments are described below in which specific types of clients, network services, computing-related resources and resource usage constraints are used in specific manners. These examples are provided for illustrative purposes and are simplified for the sake of brevity, and it will be appreciated that the inventive techniques may be used in a wide variety of other situations, some of which are described below.

Figure 2A:
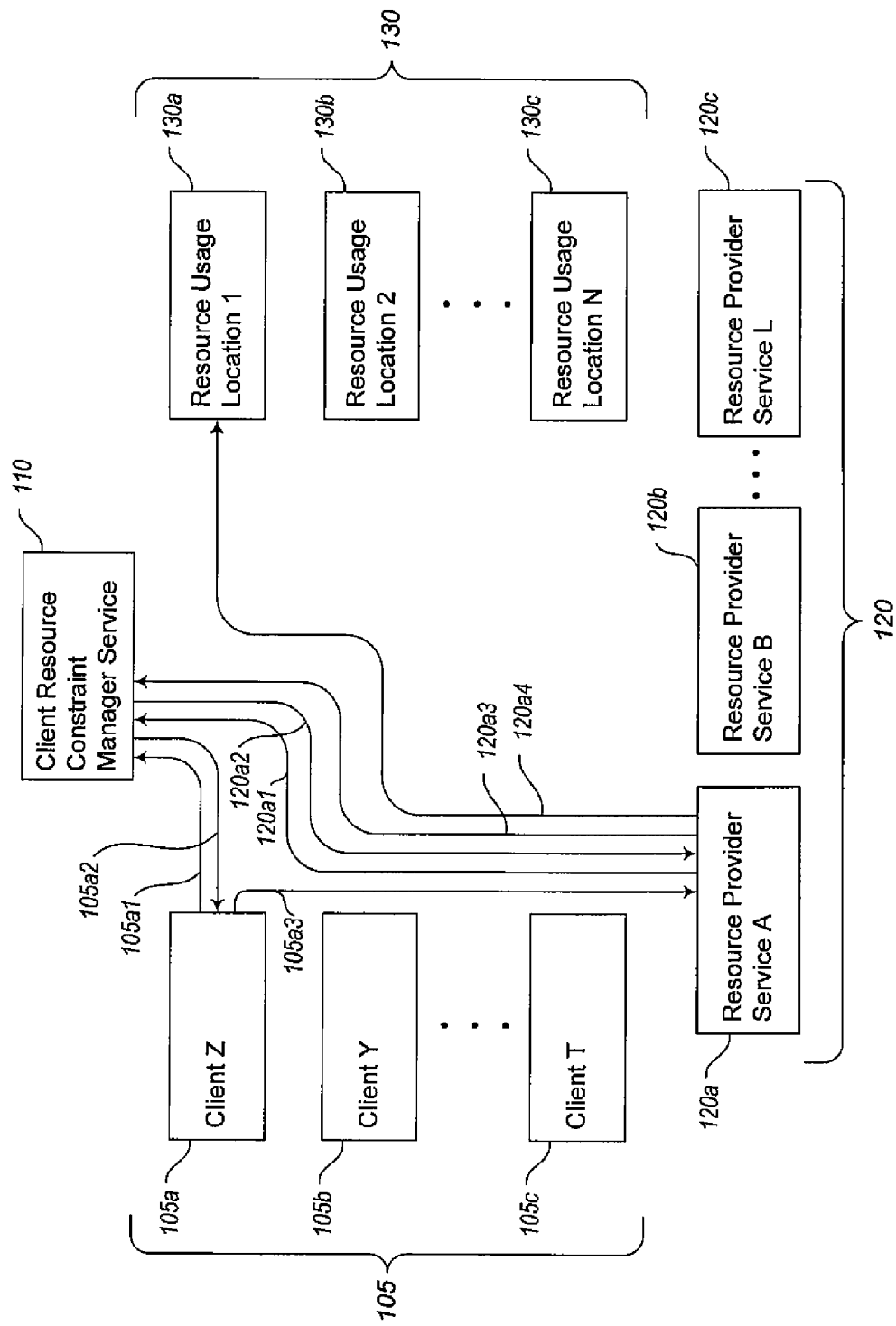
FIGS. 2A-2D illustrate examples of interactions regarding use of client resource usage constraints to control use of computing-related resources by network services on behalf of clients.

FIGS. 2A-2D illustrate examples of how the example entities illustrated in FIG. 1 may participate in various interactions regarding use of resource usage constraints to control use of computing-related resources by network services on behalf of clients. In particular, FIG. 2A depicts client Z 105a interacting with the Client Resource Constraint Manager Service 110 and with resource provider service A 120a. For purposes of this example, the resource usage locations 130a, 130b, and 130c each provide one or more types of computing-related resources for use by resource provider services operating on behalf of clients, and correspond to data centers geographically located in Seattle, Wash. (Western United States); Philadelphia, Pa. (Eastern United States); and Paris, France (Europe), respectively.

In this example, client Z first initiates one or more interactions 105a1 with the Client Resource Constraint Manager Service to specify a group of one or more resource usage constraints. In interaction 105a2, the Client Resource Constraint Manager Service provides client Z with a reference associated with the group of constraints, for use in future interactions with the Client Resource Constraint Manager Service to identify the specified constraint group. While not illustrated here, the client Z may further specify one or more other groups of one or more other resource usage constraints in other situations, such as to use different constraint groups to control use of different computing-related resources by one or more resource provider services (e.g., with one or more inter-group constraints specified that control relative use of two or more constraint groups, such as to indicate a that the constraint groups are to be mapped to target resource locations that are less than or more than a defined level of proximity), with each specified constraint group having a distinct reference.

In other embodiments, a group of one or more resource usage constraints may be specified in other and/or additional ways. For example, one or more groups may be predefined by the Client Resource Constraint Manager Service and made available for use by clients. In addition, a group may be defined by a client and shared with one or more other clients, such that the one or more other clients may use the defined group to control resource provider services in the same constrained manner as the client (e.g. such that computing-related resources used by resource provider services on behalf of the one or more other clients are located at the same one or more mapped target resource locations for the constraint group, so that use of all of the computing-related resources for the various clients occur near each other). In other embodiments, a client may have no knowledge of a Resource Constraint Manager Service, but may instead interact with a resource provider service that interacts with the Resource Constraint Manager Service on behalf of the client. For example, the resource provider service may offer capabilities that are based on use of one or more other resource provider services, and such use of the other resource provider services may be constrained in the various ways discussed elsewhere based on constraints specified by the client to the resource provider service. In such a situation, the resource provider service may interact with the Client Resource Constraint Manager Service on the client's behalf to specify the group of one or more resource usage constraints.

At some time after the interactions 105a1 and 105a2, client Z makes a request 105a3 to resource provider service A to obtain capabilities that will involve service A using one or more computing-related resources on behalf of client Z. As part of the request, client Z provides the reference associated with the specified group of one or more constraints, so that the resource usage by service A is performed in accordance with client Z's specified group of one or more constraints. Resource provider service A then makes a request 120a1 to the Client Resource Constraint Manager Service to retrieve constraint group information related to the specified constraint group, such as by passing the received reference for the constraint group. In interaction 120a2, the Client Resource Constraint Manager Service then provides the requested constraint group information to resource provider service A. In this example, the constraint group is not mapped to any particular target resource location, although the constraints of the group may limit which geographical locations may be used (e.g., if a constraint of the group specifies that a geographical area of the United States be used, the location N 130c in Paris, France will not be available to be used).

After the resource provider service A receives the constraint group information associated with the reference provided by the client Z, the resource provider service A identifies one or more target geographical locations that satisfy the constraint group and that are available to service A for use of the type of computing-related resources needed to satisfy Client Z's previously received request. As an example, the constraint group information may indicate that the client Z desires resource provider services using this particular group of constraints to use computing-related resources geographically located in the United States. In this example, the resource provider service A has access to at least two resource usage locations in the United States for use of one or more types of computing-related resources on behalf of clients, those being resource usage location 1 in Seattle, Wash., and resource usage location 2 in Philadelphia, Pa. Thus, resource provider service A may satisfy the constraint group information by using computing-related resources on behalf of the client Z in either of these locations (or in both locations if there are no constraints related to proximity of the various computing-related resources being used). In this example, resource provider service A selects resource usage location 1 in Seattle, Wash., and initiates interaction 120a3 with the Client Resource Constraint Manager Service to request that the constraint group be mapped to that target resource location, which the Client Resource Constraint Manager Service accepts (e.g., based on a first-come basis that allows any of the resource provider services to specify the mapped target geographical location for the constraint group if there is not any other currently mapped location). In interaction 120a4, the resource provider service A then interacts with computing-related resources located at resource usage location 1 as part of providing functionality to client Z, such as to perform initialization related to the resource usage (e.g., if the resource is storage, to allocate a particular block of storage that is available to Client Z) and/or to begin using one or more computing-related resources for Client Z.

In this example embodiment, the resource provider service A initiates the mapping of Client Z's constraint group to target resource location 1. The Client Resource Constraint Manager Service then stores the provided mapping information and associates it with the referenced constraint group information, such that it may be provided to other resource provider services requesting constraint group information associated with the constraint group. In such cases, other resource provider services may later use other computing-related resources on behalf of the client at the mapped target locations.

The use of computing-related resources by service A on Client's Z behalf, and Client Z's access to related functionality provided by service A, may be performed in various ways in various embodiments. For example, resource provider service A may provide functionality that includes persistent data storage, such that when client Z interacts with service A to store data and/or to request previously stored data, service A will use persistent data storage devices located in resource usage location 1. Client Z's interactions to receive such functionality may be performed in various ways in various embodiments. For example, service A may act as an intermediary between Client Z and the one or more remote computing-related resources for each interaction, or in other embodiments, the client may be directed to interact directly with the remote computing-related resources (e.g., if the resource provider services provides the client with a URI to the resource). Alternatively, in some embodiments, service A may provide instances of the service at each of multiple resource usage locations (e.g., with a front-end load balancer or other mechanism to handle initial client requests), and Client Z may be directed to interact directly with the service A instance at resource usage location 1 (e.g., service A may provide Client Z with a URI to that instance of service A for future interactions).

Thus, by using the described techniques, clients may control use of computing-related resources by resource provider services on behalf of the clients, such as by specifying a group of one or more resource usage constraints. Although FIG. 2A discusses client Z interacting with resource provider service A, it will be appreciated that client Z may in addition or instead interact with other resource provider services (e.g., resource provider service B 120b and/or resource provider service L 120c) to similarly control use of computing-related resources by these other resource provider services on behalf of client Z, and that other clients may similarly interact with one or more of the resource provider services 120.

Figure 2B:
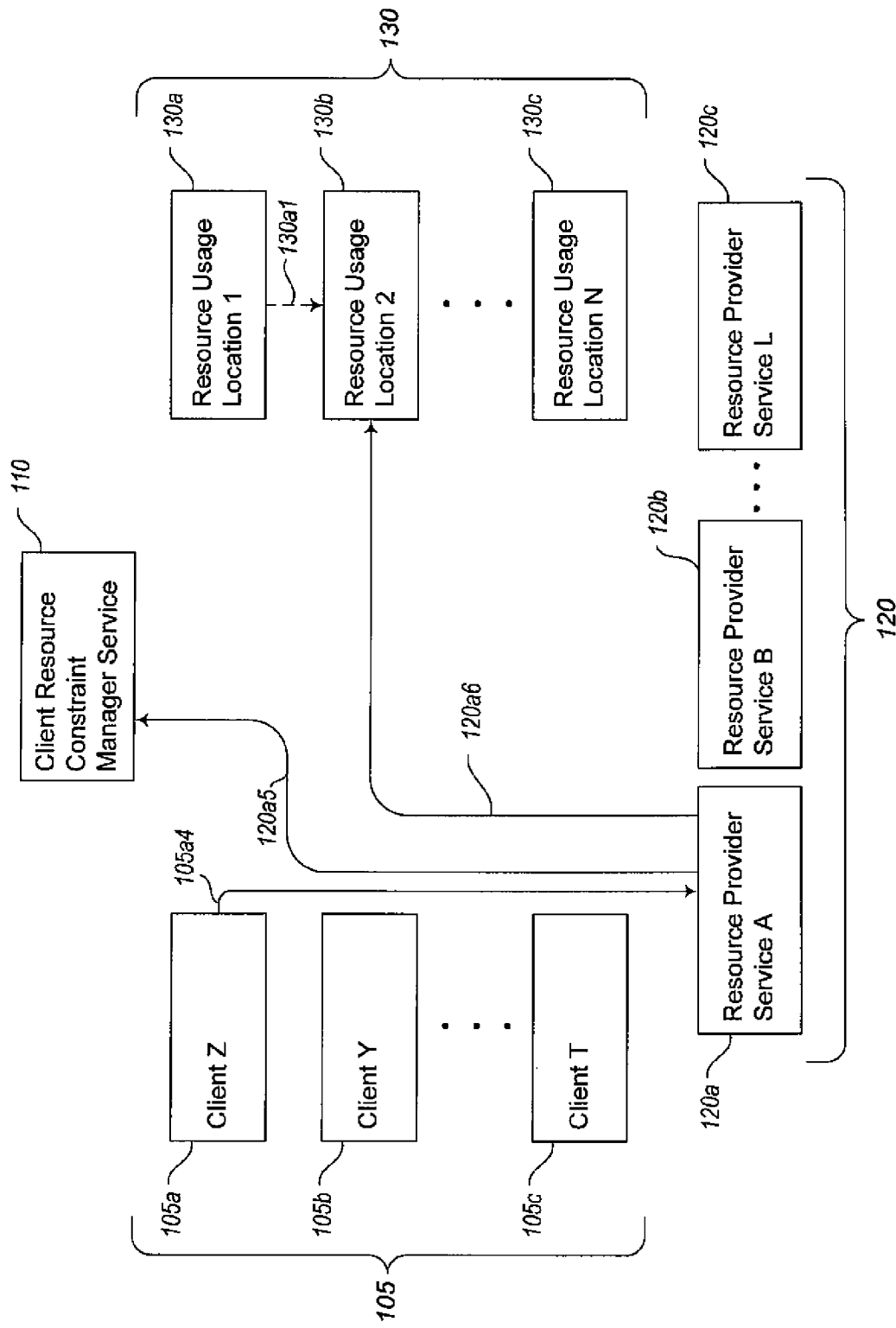

FIG. 2B continues the example of FIG. 2A at a subsequent time. In this example, resource provider service A has determined to attempt to switch the mapped target geographical location for Client Z's constraint group to a different geographical location that satisfies the constraint group (e.g., to another data center in a different location, such as due to the initial data center becoming over-utilized or a new data center becoming available), which in this example is resource usage location 2 130b in Philadelphia, Pa. After making this determination, resource provider service A initiates an interaction 120a5 with the Client Resource Constraint Manager Service to attempt to update the mapping for client Z's constraint group. In some embodiments, the Client Resource Constraint Manager Service may inform a resource provider service that an update cannot be performed (e.g., if the mapping conflicts with a mapping previously provided by another resource provider service, or some other restrictions or circumstances that prevent an update from occurring, such as a failed negotiation), and in such cases, the resource provider service will not be able make the switch and will have to continue to use resources on behalf of the client in the previously mapped target geographical location(s). If the update succeeds, the Client Resource Constraint Manager Service stores the updated mapping information for the constraint group, such that it may be provided to other resource provider services requesting to use information associated with the constraint group.

In this example, since no other resource provider services are using the constraint group, the mapping update is successful. Accordingly, in response to subsequent interactions 105a4 by Client Z with service A related to use of computing-related resources, resource provider service A performs further corresponding interactions 120a6 so as to use computing-related resources on Client Z's behalf at resource usage location 2. In some situations, a switch between mapped target geographical locations may only impact future interactions on behalf of the client with computing-related resources located in the new location. However, in other situations, such as involving ongoing use of one more resources, the switch may involve the transfer of data associated with the client (e.g., data provided by the client in past interactions with a resource provider service) between locations so as to migrate to the newly mapped target geographical location (e.g., migrating persistent data stored on behalf of a client by copying the data to resources located in the new target locations and deleting it from resources located in the prior mapped target locations). In the illustrated embodiment, optional interaction 130a1 indicates such migration of data associated with client Z from computing-related resources in resource usage location 1 to computing-related resources in resource usage location 2.

In some embodiments, after a resource provider service updates mapped target resource geographical location information associated with a particular group of constraints, the Client Resource Constraint Manager Service may notify other resource provider services that use the particular constraint group, such as to notify other resource provider services to perform any necessary updates, initialization, and/or data migration, etc. associated with the switch. Alternatively, in other embodiments, resource provider services may periodically check with the Client Resource Constraint Manager Service to determine if an update has occurred.

Figure 2C:
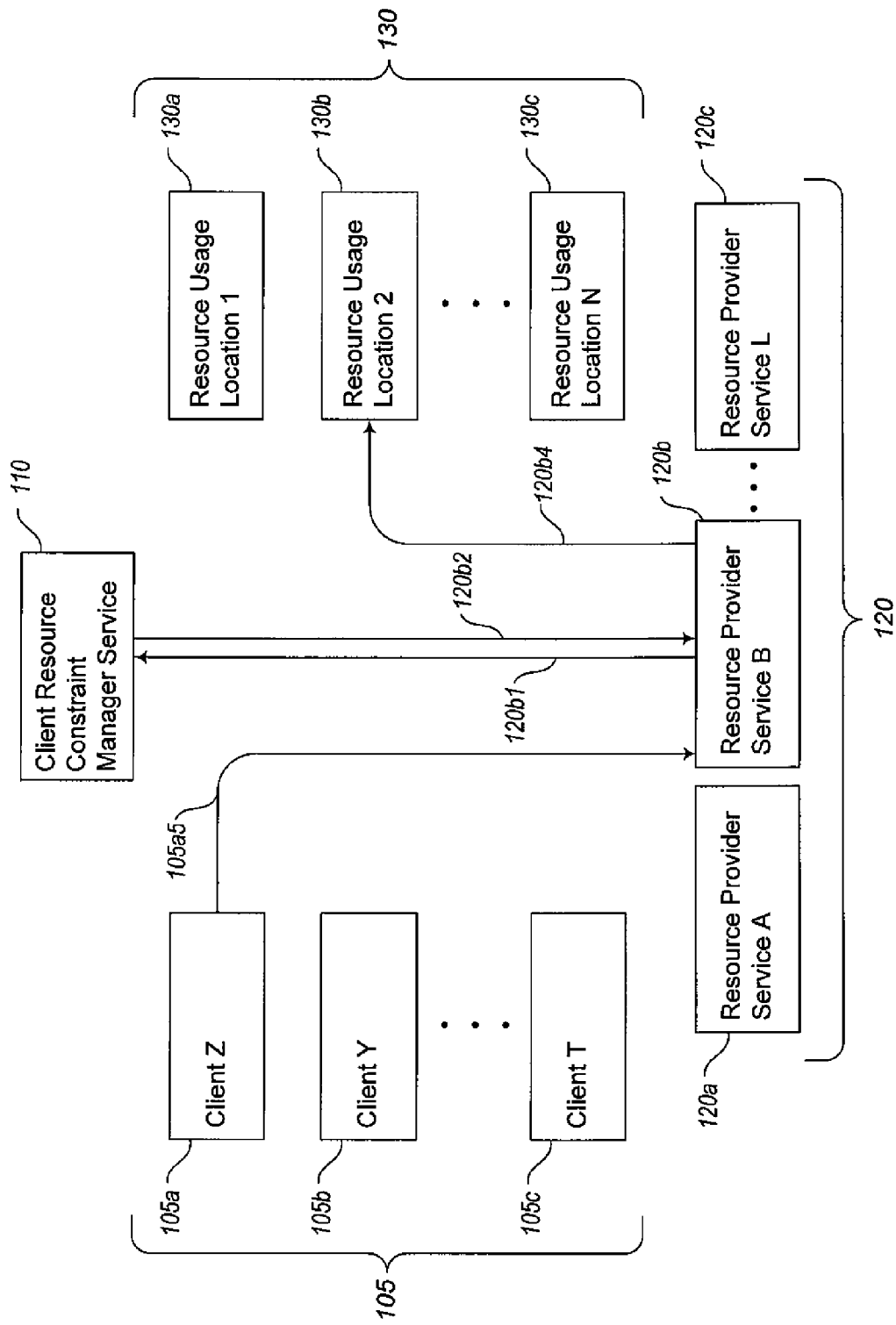

FIG. 2C continues the examples of FIGS. 2A and 2B at a time after the previously described interactions of FIG. 2B. In the illustrated embodiment of FIG. 2C, Client Z is interacting with resource provider service B 120b, which has access to one or more types of computing-related resources located at resource usage location 2 130b (and possibly at one or more other resource usage locations). In particular, Client Z initiates an interaction 105a5 with service B, such as a request for capabilities from service B that will involve service B using computing-related resources on behalf of client Z. As part of the request, client Z provides to service B the same reference associated with the previously specified group of one or more constraints of client Z.

In interaction 120b1, service B then requests constraint group information associated with the referenced constraint group from the Client Resource Constraint Manager Service, and interaction 120b2 depicts service B receiving the requested constraint group information, including the mapping of the constraint group to target geographical location resource usage location 1. After receiving the constraint group information, service B then determines whether it can provide the requested functionality to client Z in accordance with the specified constraint group, including performing any relevant computing-related resource use for Client Z at the current mapped resource usage location 2. In this example, service B is able to satisfy the constraint group. Accordingly, in interaction 120b4, service B interacts with one or more computing-related resources located at resource usage location 2 as part of responding to Client Z's request. As an illustrative example, service B may provide functionality that includes program execution services, so as to execute one or more software applications (e.g., virtual machine computing instances) on behalf of client Z on one or more computing systems located at resource usage location 2 in Philadelphia, Pa. The execution of such programs may further use some of the data stored by Client Z based on prior interactions with service A (e.g., based on the executing program dynamically reading or otherwise retrieving that information), and thus the execution of the programs may benefit from occurring near to the location where that data is stored (e.g., to minimize latency, to minimize the inability to retrieve data due to temporary transmission problems over network 100 between resource usage locations, etc.). Thus, in the example embodiment, client Z has specified resource usage constraints that control use of computing-related resources by both resource provider services A and B, such that resource provider services A and B both concurrently use computing-related resources located in resource usage location 2 on behalf of client Z.

Figure 2D:
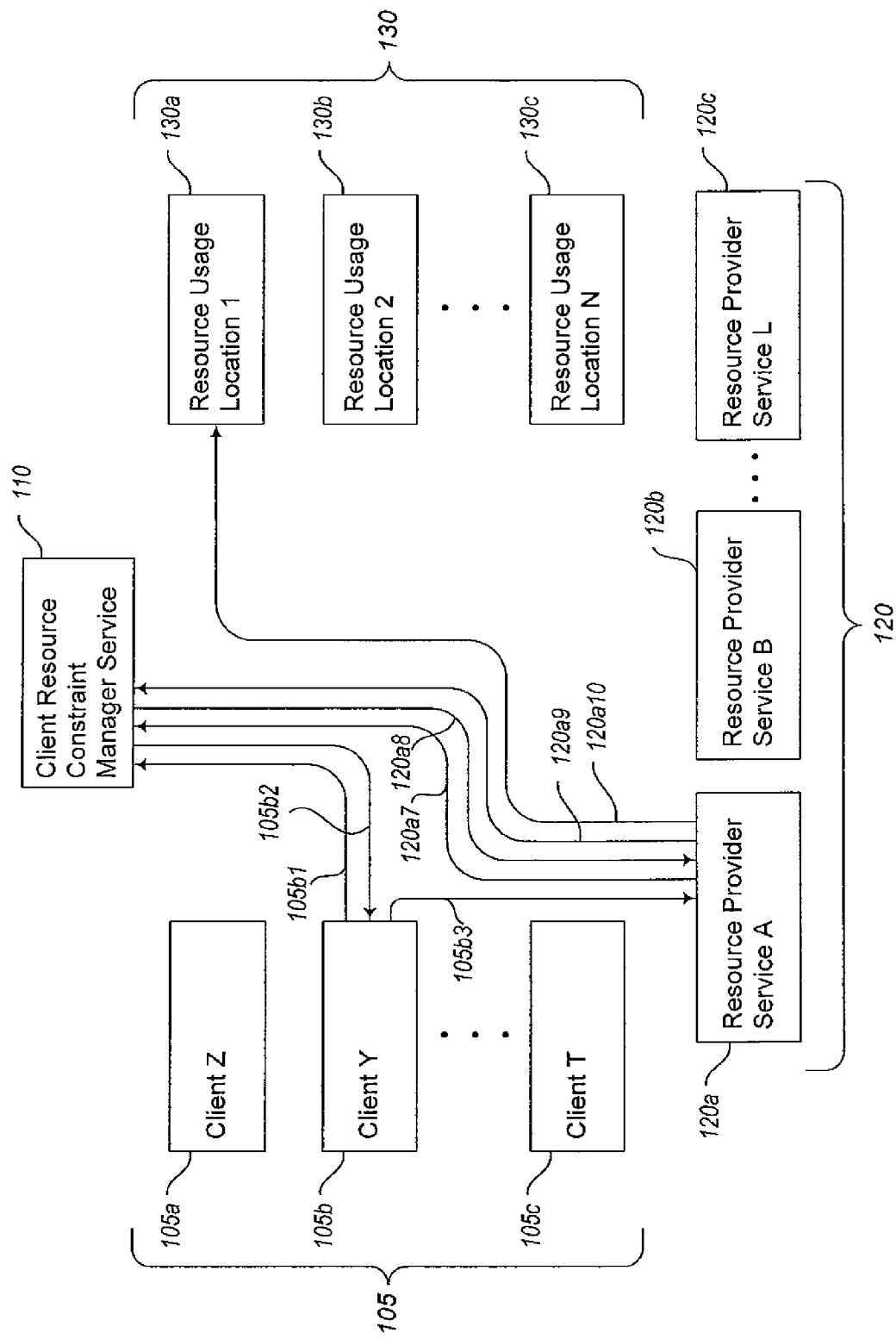

FIG. 2D continues the examples of FIGS. 2A-2C at a time after the previously described interactions of FIG. 2B. In particular, in the illustrated embodiment, Client Y initiates an interaction 105b1 with the Client Resource Constraint Manager Service 110 to specify a group of one or more resource usage constraints for Client Y, at least some of which may be different than the one or more resource usage constraints previously specified by Client Z. For example, Client Y may specify one or more constraints that indicate a geographical location of Seattle, Wash. in which computing-related resources are to be used on Client Y's behalf. A reference associated with the specified constraint group is returned to Client Y in interaction 105b2, which is a distinct reference from that provided to Client Z for the constraint group specified by Client Z. In interaction 105b3, Client Y then sends a request to resource provider service A for one or more types of functionality that involve service A using one or more computing-related resources on behalf of Client Y, and provides the reference for the specified constraint group that will control the use of those resources. Resource provider service A then requests and receives the constraint group information associated with Client Y's group of constraints, as shown in interactions 120a7 and 120a8.

After receiving the constraint group information, resource provider service A then determines from the information that Client Y has specified the geographical location of Seattle, Wash., and in this example is able to access and use computing-related resources located in a data center represented by resource usage location 1 in Seattle, Wash. Accordingly, in interaction 120a9, resource provider service A sends a request to the Client Resource Constraint Manager Service to map resource usage location 1 to Client Y's constraint group, and receives indication of approval of that mapped location. In other embodiments, resource provider service A may further have access to computing-related resources in multiple data centers at various locales in Seattle, Wash. (e.g. Seattle resource usage location 1, Seattle resource usage location 2, etc.), and if so may select a particular one or more of the various data centers to use in accordance with Client Y's constraint group, and provide information to the Client Resource Constraint Manager Service regarding those selected data centers. In such embodiments, the Client Resource Constraint Manager Service may map the particular data centers to Client Y's constraint group, or instead map the constraint group to the geographical location of Seattle, Wash. (and further track which data centers are used by service B, such as to allow other resource provider services to satisfy proximity-related constraints for the constraint group that involve the use of other resources within the same data centers) or to other levels or types of geographical locations (e.g., to multiple related data centers that are located within a specified geographical area and/or that are connected via one or more high-speed data connections). In interaction 120a10, resource provider service A then initiates use of one or more computing-related resources at resource usage location 1 on behalf of Client Y, such as while concurrently using one or more computing-related resources at resource usage location 2 for Client Z as discussed with respect to FIG. 2B. Thus, in the illustrated embodiment of FIGS. 2A-2D, resource provider service A provides functionality to both Clients Z and Y, and uses computing-related resources mapped to different target geographical locations for the clients based on constraints specified by the clients.

As previously noted, clients may specify and use a variety of types of computing-related resource usage constraints in various embodiments, and such constraints may take a variety of forms. For example, a client may specify constraints related to a particular geographical location, such as by indicating a location of one or more computing systems or other computing-related resources (e.g., a data center, a group of multiple related data centers, a particular physical computing system, a particular rack of multiple computing systems, a group of computing systems connected by one or more particular network switches or other networking devices, etc.), by specifying a particular geographical area (e.g., North America, Europe, Asia, the Pacific Northwest, the Pacific Rim, etc.), by specifying a geopolitical entity (e.g., a state, a nation, a community of nations such as the European Union, etc.), by specifying a geographical area within a geopolitical entity (e.g., the West Coast of the United States), etc. In other embodiments, location-related constraints may be specified in other manners, such as on the basis of regulatory considerations (e.g., regulations of a geopolitical entity, such as taxation, privacy rights, etc.), such that the constraint corresponds to one or more geographical locations consistent with the client-specified regulatory considerations.

Another example of a type of constraint related to geographical locations that may be used in some embodiments are constraints related to operational characteristics of use of computing-related resources by resource provider services (e.g., latency, bandwidth, throughput, etc.), such that network services operating on behalf of a client may utilize computing-related resources in a geographical location consistent with client-specified operational characteristics. As one illustrative example, consider a client that provides capabilities to customers who are located in a particular geographical area. The provided capabilities of the client may use resource provider services that use computing-related resources on behalf of the client. In this situation, for example, the client may specify constraints to minimize latency associated with use of the resource provider services related to the customers, such as when providing information to customers from storage provided by a resource provider service. Accordingly, such constraints may cause the resource provider services to use computing-related resources that are geographically located near the particular geographical area of the customers, such as to minimize the distance between the computing-related resources and the customers.

Individual constraints and groups of constraints may have various forms in various embodiments. For example, in some embodiments, a group of constraints may be specified as an XML document, with each constraint being a tagged portion of the document. In other embodiments, each constraint may be specified in other forms, such as a rule, an if-then statement, executable code that provides output indicating the constraint content (e.g., based on obtaining one or more types of input, such as current conditions) and/or indicating whether particular input information (e.g., a geographical location) satisfies the constraint, etc. The types of constraints that may be specified may further be extendible in at least some embodiments, such as to allow a resource provider service to specify new types of constraints for use by itself and/or by any resource provider service. In addition, in at least some embodiments, some individual constraints may further be specified by a client to apply only in certain situations, such as only for particular types of resources, only for particular resource provider services or types of resource provider services, only at certain times or when current conditions satisfy other indicated criteria, etc.

In addition, access to a specified group of constraints may be controlled in various ways in various embodiments. For example, in some embodiments a constraint group may be publicly available to any resource provider services and/or clients that request information about the constraint group, while in other embodiments a particular constraint group may have various access restrictions that are specified by the Client Resource Constraint Manager Service and/or by the client that specified the constraint group. As one example, a constraint group may not be accessible other than by parties that demonstrate authorization to access the constraint group, such as the reference generated for the constraint group and/or other access authorization information (e.g., a password, an indication of access rights delegated by the client that specified the constraint group, etc.). In addition, in some embodiments, a constraint group may be private, such that access is provided only to the client that specified the constraint group and to others authorized by the client (e.g., to resource provider services that the client instructs to use the constraint group).

In addition, an embodiment of the Client Resource Constraint Manager Service may have various forms and be implemented in various ways. For example, in some embodiments the Client Resource Constraint Manager Service may be a remote network service that various clients and resource provider services interact with over a network (e.g., clients and resource provider services that are unaffiliated with the Client Resource Constraint Manager Service other than based on such interactions, such as to be provided by unrelated entities), and may be implemented on a single physical computing system or instead in a distributed manner on multiple physical computing systems in different geographical locations. In other embodiments, the Client Resource Constraint Manager Service may be integrated together with one or more client applications (e.g., such as to manage constraints for only that client application) and/or with resource provider services (e.g., such as to manage constraints that are used only by those resource provider services). In addition, the Client Resource Constraint Manager Service may facilitate various types of interactions by clients and resource provider services, including programmatic interactions based on an API provided by the Client Resource Constraint Manager Service and/or interactive interactions based on a graphical user interface provided to users (e.g., via one or more Web pages, via a client-side application of the Client Resource Constraint Manager Service that executes on a computing device of a user, etc.).

In addition, in at least embodiments, various relationships may be specified between multiple constraint groups. For example, in some embodiments, constraints may be specified between multiple constraint groups, such as to indicate that two constraint groups are to be mapped to target resource locations that have a specified degree or type of proximity (e.g., to be within an indicated distance, to be farther than an indicated distance, to be sufficiently non-proximate to provide an indicated level of fault tolerance, to be sufficiently proximate to provide an indicated level of bandwidth or to be less than an defined level of latency, etc.). In addition, in some embodiments a hierarchy of constraint groups may be specified, such that one constraint group is specified to include all the constraints of one or more other constraint groups, and optionally one or more additional constraints. Furthermore, in some embodiments, constraint groups may be organized based on geographical locations and/or areas to which the constraint groups are mapped and/or are limited to.

Figure 3:
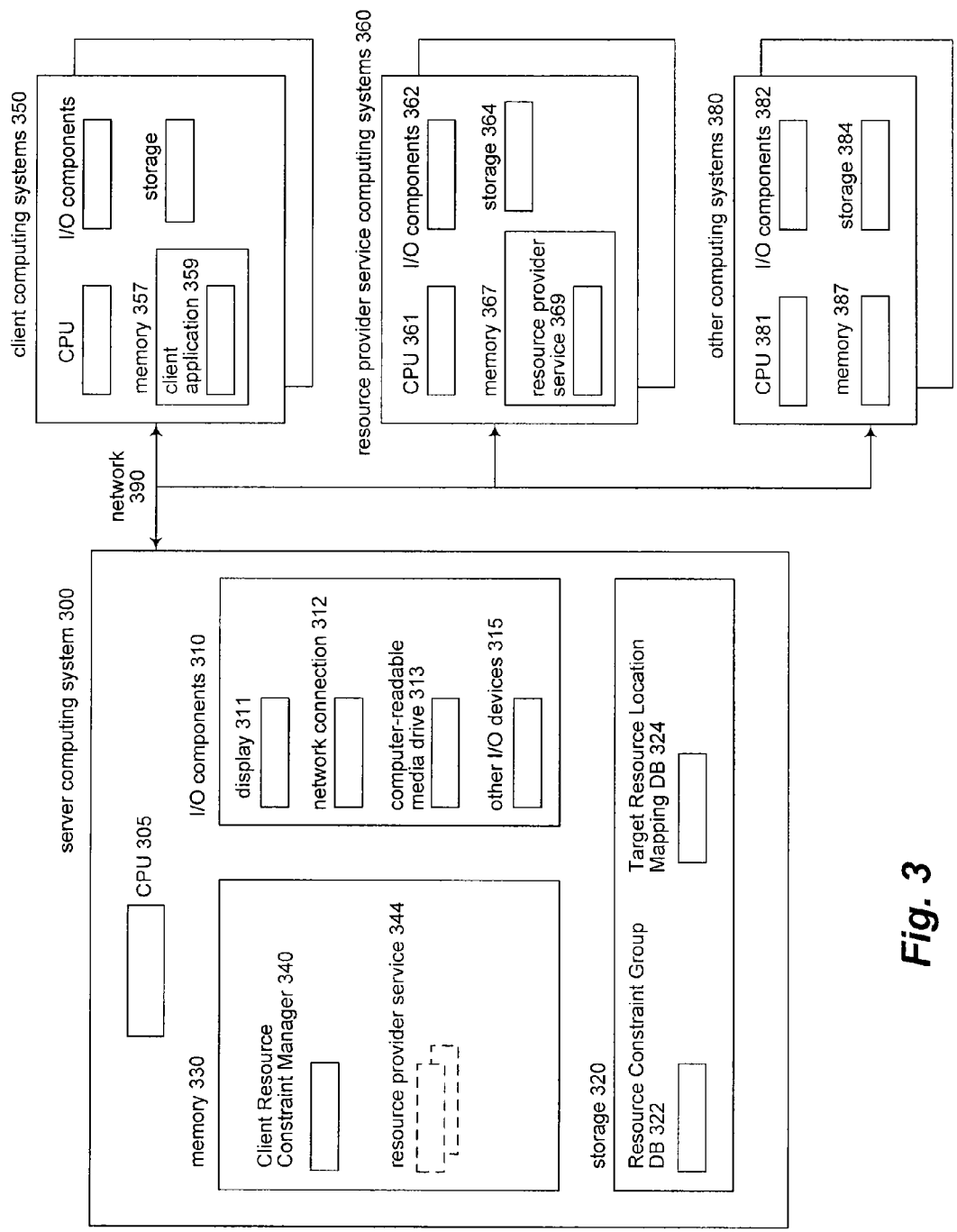
FIG. 3 is a block diagram illustrating an example computing system suitable for executing an embodiment of a software system for facilitating use of computing-related resources on behalf of clients.

FIG. 3 is a block diagram illustrating an example computing system suitable for performing techniques for facilitating client control over use of computing-related resources on the client's behalf. In particular, FIG. 3 illustrates a server computing system 300 suitable for executing an embodiment of a Client Resource Constraint Manager Service, as well as various client computing systems 350, resource provider service computing systems 360, and other computing systems 380. In the illustrated embodiment, the server computing system 300 has components that include a CPU 305, various I/O components 310, storage 320, and memory 330. The I/O components include a display 311, a network connection 312, a computer-readable media drive 313, and other I/O devices 315 (e.g., a mouse, keyboard, speakers, etc.).

In this illustrated embodiment, a software Client Resource Constraint Manager system 340 is executing in memory 330 to provide a Client Resource Constraint Manager Service, and it interacts with the client computing systems 350 and 360 over a network 390 using the network connection 312 (e.g., via the Internet and/or the World Wide Web, cellular network, etc.). In particular, an end-user of a client computing system 350 may interact with the system 340 in order to provide information about one or more groups of resource usage constraints for the client, such as via a client application 359 executing in memory 357 of the client computing system 350, as well as to perform other related interactions. The Client Resource Constraint Manager system stores the various client-specified constraint information in a database ("DB") data structure 322 on storage 320, and may further associate one or more references with each constraint group. In addition, as discussed in greater detail elsewhere, each group of one or more constraints may be mapped to one or more target geographical locations, such as based on decisions made by resource provider services as part of using computing-related resources of behalf of clients in accordance with a group of constraints. Information about the target geographical locations to which constraints groups are mapped is stored in the illustrated embodiment in a database 324 on storage 320, although in other embodiments the information about constraints and about mapped target geographical locations may be stored in other manners, such as in a single database. In addition, a variety of other types of information may be stored and used by the Client Resource Constraint Manager system in some embodiments, such as information about clients (e.g., client login information, access rights and information regarding others who may access and/or use a client's constraint group in one or more ways, etc.), and information about resource provider services (e.g., information about possible geographical locations at which the resource provider service has access to use resources, information about particular resources of particular types that the resource provider service has access to use, etc.).

After a particular end-user client has specified a group of one or more resource usage constraints, information about those constraints may then be provided by the system 340 to one or more resource provider service computing systems 360 that provide functionality to the client. In particular, in the illustrated embodiment, each of the resource provider service computing systems includes a system 369 executing in memory 367 of the computing system 360 that provides a particular resource provider service to clients (e.g., to client applications 359 of client computing systems 350 on behalf of the end-user clients for those computing systems). Each of the resource provider services provided by a system 369 may use one or more computing-related resources of one or more types on behalf of clients when providing functionality to those clients, such as one or more computing-related resources from one or more of the computing systems 360 and/or from one or more of the other computing systems 380. For example, computing-related resources that may be used in at least some embodiments include access to one or more CPUs 381 and/or CPUs 361, a portion of one or more memories 387 and/or memories 367, a portion of one or more storages 384 and/or storages 364, access to one or more I/O components 382 and/or I/O components 362, etc. After a resource provider service obtains information from the system 340 regarding the constraints for a client (e.g., based on a reference to a client's constraint group that the client provides to the resource provider service, and that the resource provider service provides to the system 340), the resource provider service determines where and how to use one or more resources on the client's behalf in accordance with those constraints, including in accordance with any target geographical locations to which a constraint group is mapped. The resource provider service may further provide various information to the system 340 regarding use of computing-related resources on clients' behalf, such as a particular geographical location at which the resource provider service has selected to use such resources (e.g., from multiple possible geographical locations that all satisfy the constraints of the client).

In addition, one or more systems 344 may also optionally be executing in memory 330 in some embodiments to each provide one or more other resource provider services, such as if the same entity that provides the system 340 also provides the one or more systems 344. In other embodiments, the system 340 may be unaffiliated with some or all of the resource provider services that obtain constraint information from the system 340.

Those skilled in the art will appreciate that the computing systems 300, 350, 360 and 380 are merely illustrative and are not intended to limit the scope of the embodiments of the present disclosure. For example, the system 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device may comprise any combination of hardware or software that can interact in the indicated manners, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the system 340 may in some embodiments be distributed in various components. Similarly, in some embodiments, some of the functionality of the system 340 may not be provided, and/or other additional functionality may be available.

Those skilled in the art will also appreciate that, while various items are discussed or illustrated as being stored in memory or on storage while being used, these items or portions of them may be transferred between memory and other storage devices for purposes of memory management and data integrity. Alternatively, in other embodiments some or all of the software systems or components of those systems may execute in memory on another device and communicate with the illustrated computing systems via inter-computer communication. Furthermore, in some embodiments, some or all of the systems and/or components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components and/or data structures may also be stored (e.g., as executable or other machine-readable software instructions or structured data) on a computer-readable medium, such as a hard disk, a memory, a network, or a portable media article to be read by an appropriate drive or via an appropriate connection. The systems, components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
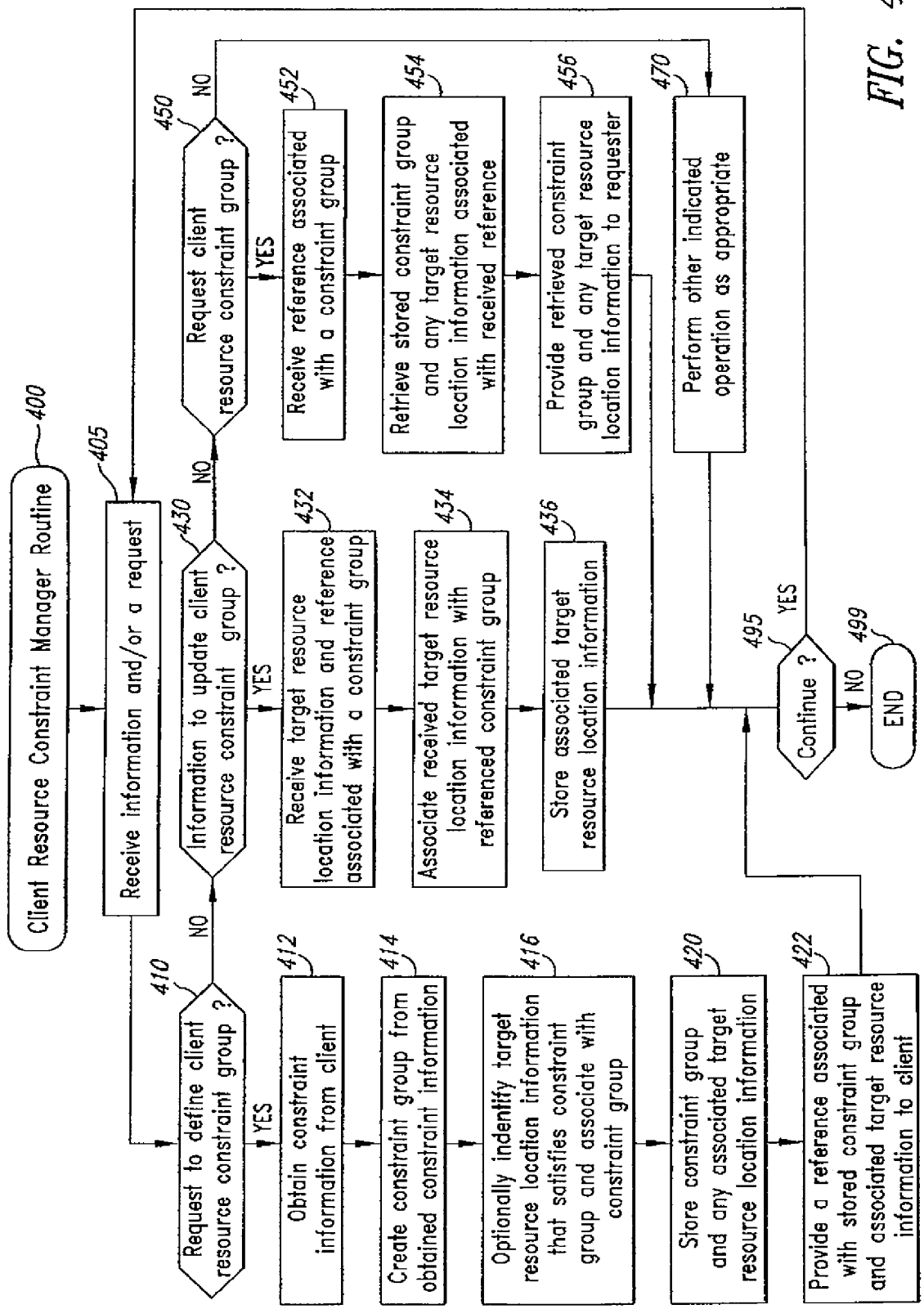
FIG. 4 illustrates a flow diagram of an example embodiment of a Client Resource Constraint Manager routine.

FIG. 4 is a flow diagram of an example embodiment of a Client Resource Constraint Manager routine 400. The routine may be provided by, for example, execution of an embodiment of the Client Resource Constraint Manager Service 110 of FIG. 1 and/or of the Client Resource Constraint Manager system 340 of FIG. 3, such as to manage resource usage constraints specified for clients in order to control use of computing-related resources by other services on behalf of the clients. In this illustrated embodiment, constraints are specified by clients for the clients, but in other embodiments the constraints may be specified in other manners. For example, in some embodiments, constraints may be specified by or for entities other than clients, such as by or for resource provider services. In addition, in other embodiments, constraints may be specified for a client by someone other than the client, such as automatically by the Client Resource Constraint Manager Service and/or by resource provider services. In addition, while in some embodiments the specified constraints control use of computing-related resources by resource provider services, in other embodiments the constraints may be used in other manners, including to control some types of activities that are not related to use of computing-related resources, including at least some types of activities that are performed by the Client Resource Constraint Manager Service.

The illustrated embodiment of the routine 400 begins at block 405, where an indication is received of a request related to constraints and/or of information related to constraints. The routine continues to block 410 to determine whether a request was received from a client to define a group of one or more client resource usage constraints for the client. If so, the routine continues to block 412 to obtain constraint information from the client, such as constraint information specified in the request received in block 405, and/or information received in block 412 based on an interaction with the client (e.g., an interactive interaction with a particular end-user client). The routine then continues to block 414 to create a constraint group for the client based on the obtained constraint information. The creation of a constraint group may include, for example, generating one or more references for the constraint group, so as to allow the client and/or resource provider services to later reference the constraint group and obtain information about the constraints of the group. Such references may have various forms in various embodiments, such as a unique identifier, a computer-readable link or other network-accessible address, etc. In other embodiments, one or more references for a constraint group may be determined in other manners, such as by being specified by the client.

After block 414, the routine continues to block 416 to optionally identify one or more target geographical resource locations that satisfy the constraints of the group, and if so to map those one or more identified target locations to the constraint group. For example, if the routine 400 has access to information about the resource provider services with which the constraint group may be used, and about possible target resource locations at which each of those resource provider services are able to use resources, the routine may in some embodiments automatically determine one or more target resource locations that all of the resource provider services are able to use, and select those target resource location(s) to be mapped to the constraint group such that each of the resource provider services will later use resources in accordance with the constraint group at one or more of those mapped target resource locations. Alternatively, in other embodiments, the one or more target resource locations to which a constraint group will be mapped may later be specified by one or more resource provider services, such as in a cooperative manner amongst multiple resource provider services (e.g., based on an automated negotiation) or instead under control of a single resource provider service (e.g., the first resource provider service to use the constraint group; a primary resource provider service that has authority to make the mapping determination, such as due to having the most constrained set of possible resource locations and/or having a highest associated priority; etc.). In other embodiments, at least some constraint groups may not have mapped target locations, such that each resource provider service that uses resources in accordance with the constraint group will independently select a target resource location at which to use resources, as long as the selected location satisfies the constraints of the constraint group. After block 416, the routine then continues to block 420 to store the information about the constraint group and any mapped target resource location information. In block 422, the routine then indicates the successful creation of the constraint group to the client, and in the illustrated embodiment provides to the client a reference that is associated with the storage restraint group, for later use by the client and/or other resource provider services in referencing the constraint group.

If it was instead determined in block 410 that the received request was not to define a client resource constraint group, the routine continues instead to block 430 to determine whether a request was received from a resource provider service to update information associated with a client resource constraint group. In particular, in the illustrated embodiment, resource provider services send information to the Client Resource Constraint Manager Service to provide information about their use of computing-related resources in accordance with constraint groups, such as to indicate geographical locations at which the resource provider services are using such computing-related resources—for example, if the constraint group is mapped to multiple target resource locations (e.g., to a group of nearby data centers), a resource provider service may indicate a particular one of the target resource locations at which the resource provider service is using resources, or may instead merely indicate that the resource provider service is currently using one or more resources at one or more of the mapped target resource locations without indicating a particular one. In addition, in at least some embodiments (e.g., embodiments in which the Client Resource Constraint Manager Service does not automatically determine mapped target resource locations for constraint groups), some or all resource provider services may in at least some situations specify and update target resource locations to which constraint groups are mapped (e.g., if the constraint group is not currently mapped to any target resource location), as discussed in greater detail elsewhere. In the illustrated embodiment, if it is determined in block 430 that a request was received from a resource provider service to update information associated with a client resource constraint group, the routine continues to block 432 to receive indicated target resource location information for an indicated constraint group (e.g., a constraint group indicated with an associated reference for the constraint group, with an indication of the client to which the constraint group is associated, etc.), such as based on information received with the request in block 405. Target resource locations may be indicated in various ways in various embodiments, such as based on a defined addressing scheme (e.g., GPS coordinates, street addresses, etc.), from an enumerated list of predefined locations, etc. After block 432, the routine continues to block 434 to associate the received target resource location information with the constraint group, and in block 436 stores the target resource location information.

In addition, if the request from the resource provider service is further to map the indicated constraint group to the indicated target resource location, and that mapping by that resource provided service is allowed, the information for the indicated constraint group will further be updated in blocks 434 and 436 to reflect that mapping. While not illustrated here, in some embodiments, the routine may perform various types of actions to determine whether the resource provider service is allowed to specify a mapped target resource location information for the indicated constraint group, such as based on access permissions previously defined for the constraint group, based on an indication from the resource provider service of other authorization from the client to specify the mapped target resource location, based on whether any other target resource location information is currently mapped to the indicated constraint group (e.g., to allow resource provider services to specify mapped target resource locations on a first-come basis for a constraint group such that the mapping succeeds if there is not a current mapping), based on whether the indicated target resource location is compatible with one or more other target resource locations to which the indicated constraint group is already mapped (e.g., that the multiple target resource locations satisfy any proximity-related constraints for the indicated constraint group), etc. If a resource provider service specifies that an indicated constraint group is to be mapped to an indicated resource location but that mapping is not allowed, however, the routine may in some embodiments respond to the request with an indication of failure or an error. If so, the resource provider service may then optionally take one or more additional related actions, as discussed with respect to the resource provider service routine illustrated in FIGS. 5A and 5B.

If it was instead determined in block 430 that the received request was not from a resource provider service to update information for a client resource constraint group, the routine continues instead to block 450 to determine whether a request was received for information about an indicated client resource constraint group, such as from a resource provider service. If so, the routine continues to block 452 to receive an indication of the constraint group of interest (e.g., based on information received with the request at block 405), such as a reference associated with a constraint group, an indication of the client to whom the constraint group is associated, etc. In block 454, the routine then retrieves stored information about the constraint group, including any constraints of the group and information about any target resource location(s) to which the constraint group is mapped. In block 456, the routine then provides at least some of the retrieved information about the constraint group to the requester, such as to indicate information about the constraints and any mapped target resource location. While not illustrated here, in some embodiments the routine may further perform additional actions to restrict at least some information about the constraint group for at least some requesters. For example, in some embodiments a requester may further need to illustrate permission from a client or other access rights in order to obtain information about a particular constraint group. In addition, in some embodiments, at least some resource provider services may be allowed to define constraint types that are specific to that resource provider service (or to a group of multiple resource provider services), and if so, a particular constraint group may include one or more such service-specific constraints (e.g., as expressed by the client for use by that resource provider service, as expressed by the resource provider service based on prior interactions with the client and the constraint group, etc.)—in such embodiments, if any such service-specific constraints are included in a constraint group, those constraints may be provided only to those resource provider services to which the constraints correspond (and thus may be removed from the constraint group information provided to other resource provider services), although in other embodiments all such constraints may be provided to all resource provider services and such service-specific constraints may be ignored by other services to which those constraints do not correspond.

If it is instead determined in block 450 that the received request was not to obtain information about an indicated client resource constraint group, the routine continues instead to block 470 to perform one or more other indicated operations as appropriate. For example, after defining a constraint group, a client may determine to modify or update various information about the constraint group, and if so that information may be updated in block 470 based upon a corresponding client request. In other embodiments, however, a client may not be allowed to update a constraint group after it is created and/or after it is used by one or more resource provider services (or while the constraint group is being used by one or more resource provider services), such as to prevent a prior or ongoing use by a resource provider service of resources in accordance with the constraint group to become invalid based on new changes made by the client. In addition, as previously noted, in some embodiments multiple resource provider services may interact in order to negotiate or otherwise determine one or more target resource locations to which a particular constraint group is to be mapped, and if so the routine may in at least some such embodiments facilitate such negotiation in block 470 by forwarding messages between the resource provider services and/or performing other operations to facilitate the negotiation.

Similarly, as previously noted with respect to block 416, in at least some embodiments the routine 400 may further perform automated activities related to mapping at least some constraint groups to particular target resource locations, such as to reflect one or more resource provider services that may use the constraint group—in such embodiments, the routine 400 may further at times (e.g., periodically) determine to assess whether to modify the target resource locations to which particular constraint groups are currently mapped, such as to select a new mapped target resource location for a constraint group so as to accommodate the various resource provider services that are currently using the constraint group (e.g., whether in a cooperative manner with those resource provider services based on interactions with them, or instead in a manner independent of those resource provider services), and/or to otherwise reflect current conditions. If so, the routine in block 470 may receive an indication (e.g., based on expiration of a timer) to perform such an assessment and optionally to modify target resource locations to which one or more constraint groups are mapped, and if so perform those operations with respect to block 470. In addition, the routine 400 may further notify any resource provider services that are currently using a constraint group of the change in the mapped target resource location for the constraint group, such as by pushing information to those resource provider services about the new mapped target resource locations. Various other types of operations may similarly be performed with respect to block 470 in at least some embodiments.

After blocks 422, 436, 456, or 470, the routine continues to block 495 to determine whether to continue. If so, the routine returns to block 405, and if not continues to block 499 and ends.

Figure 5A:
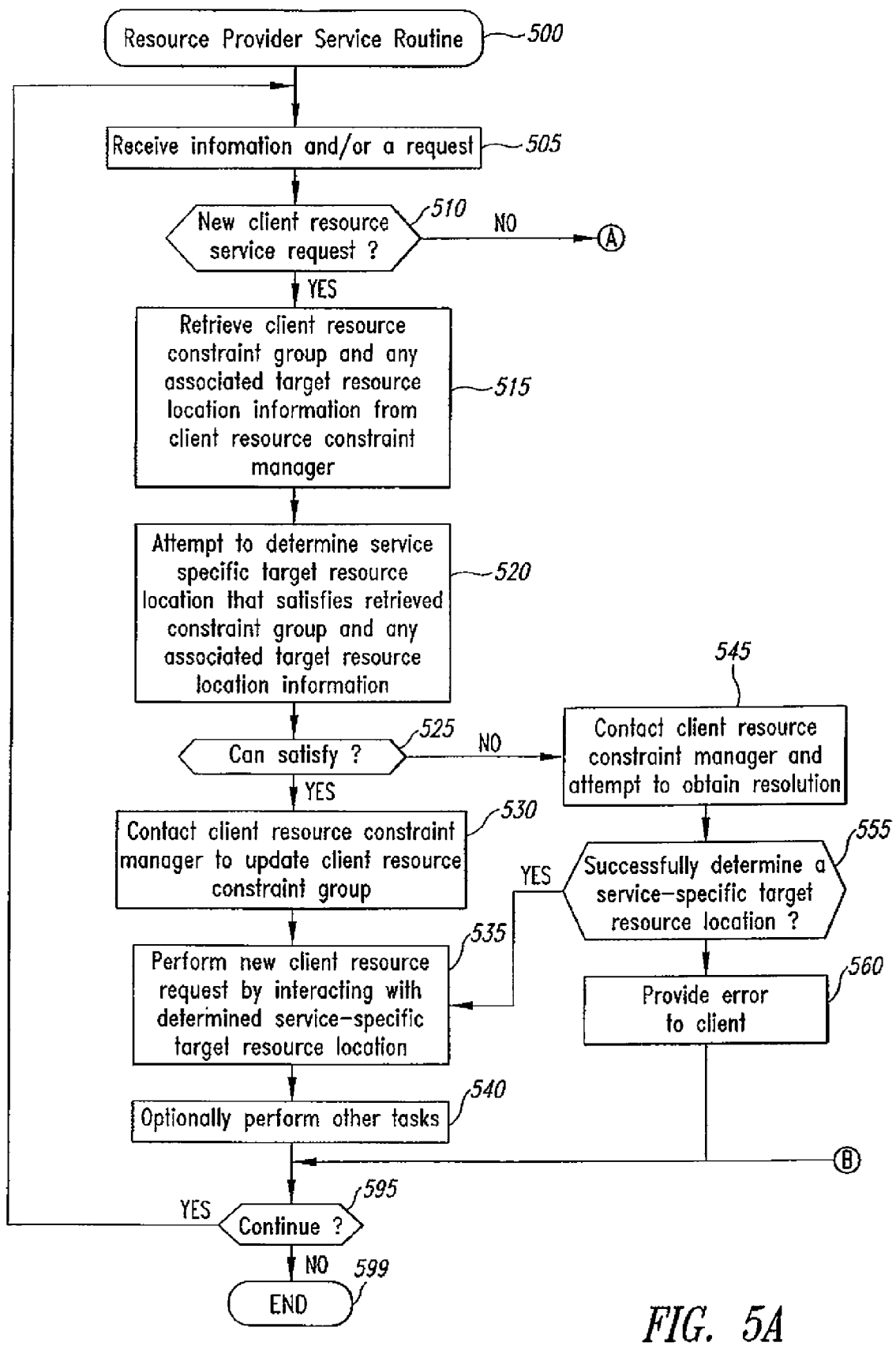
FIGS. 5A and 5B illustrate a flow diagram of an example embodiment of a Resource Provider Service routine.
Figure 5B:
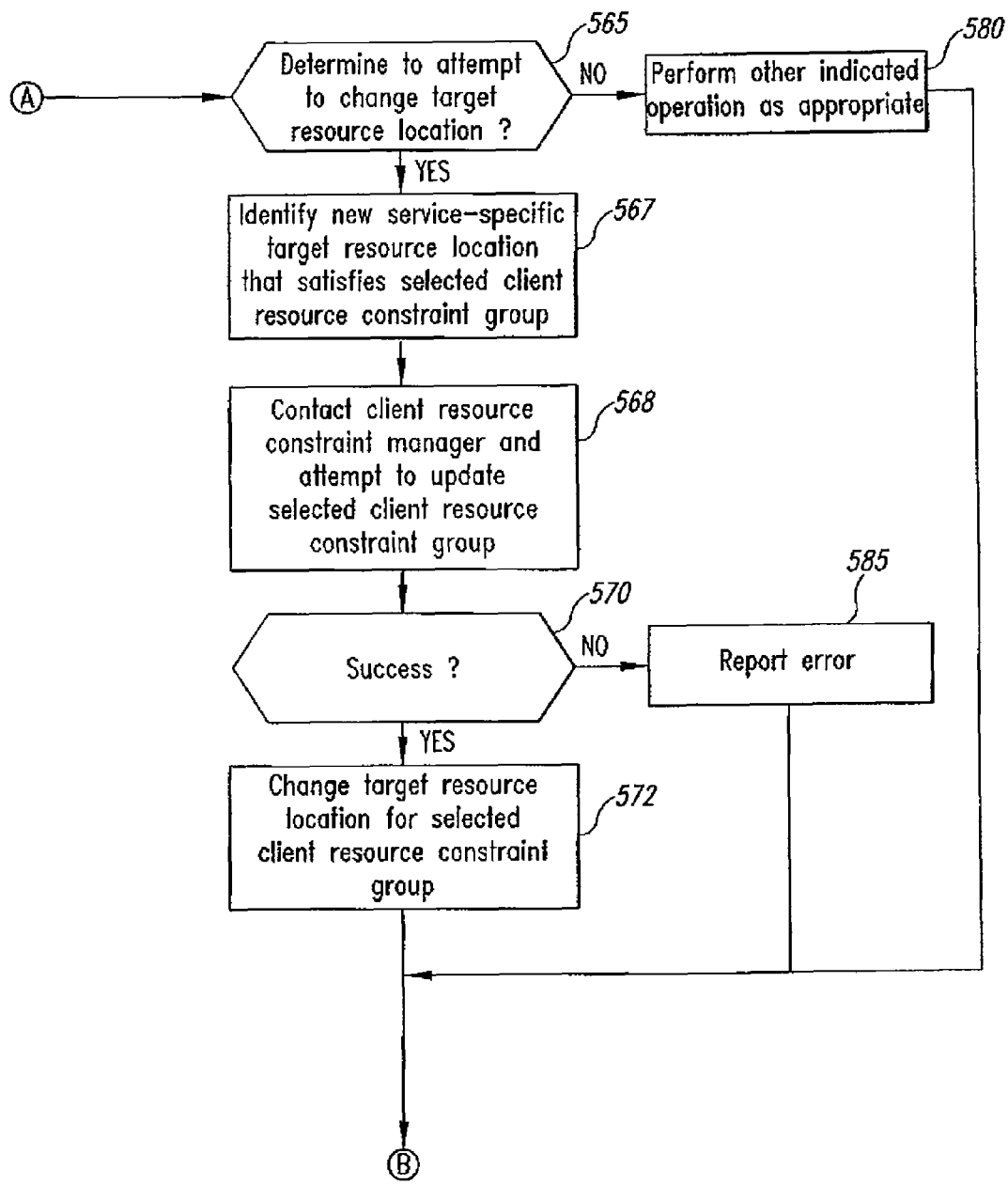

FIGS. 5A and 5B are a flow diagram of an example embodiment of a Resource Provider Service routine 500. The routine may be provided by, for example, execution of a resource provider service that uses resources on behalf of clients in accordance with specified constraints of the clients, such as one of the services 120 of FIG. 1, one of the services 369 of FIG. 3, and/or one of the services 344 of FIG. 3. In the illustrated embodiment, only a subset of the activities of each such resource provider service is illustrated, in particular for a subset of activities related to interactions with an embodiment of a Client Resource Constraint Manager Service (e.g., as described with respect to routine 400 of FIG. 4). It will be appreciated that each such resource provider service will further provide various service-specific capabilities to clients and take various corresponding actions, which are not illustrated here for the sake of brevity.

The illustrated embodiment of the routine begins at block 505, where an indication is received of a request from a client or of another communication (e.g., from the Client Resource Constraint Manager Service or from another resource provider service). The routine continues to block 510 to determine if the received request is a request from a new client that involves use of one or more resources on behalf of the client to accommodate the request. If so, the routine continues to block 510 to retrieve information from the Client Resource Constraint Manager Service about an indicated constraint group for the client, such as based on a constraint group resource or other indication that is received from the client in the request received in block 505 and/or interactively in block 515. As described with respect to blocks 452-456 of FIG. 4, such retrieved constraint group information may include information about the one or more specified constraints of the group, and any target resource location(s) to which the group is currently mapped. Furthermore, in some embodiments in which other resource provider services are currently using resources in accordance with the constraint group at one or more particular target resource locations, such information may further be provided to the routine in block 515.

After obtaining the information related to the constraint group, the routine continues to block 520 to attempt to determine a target resource location that is available to the resource provider service at which to use the indicated resources on behalf of the client, and that further satisfies the retrieved constraint group information, including any existing mappings of target resource locations for the constraint group. In block 525, the routine determines whether it can satisfy the constraint group with such a service-specific target resource location, and if so continues to block 530 to contact the Client Resource Constraint Manager Service to update information for the constraint group to indicate the service-specific target resource location that the service will use. In this manner, other resource provider services that later obtain information about the constraint group may be able to perform their own service-specific determinations of target resource locations in a manner to satisfy any constraints related to proximity of the later services' resource usage with the resource usage by the current service. The routine then continues to block 535 to initiate or otherwise perform use of or other interactions with one or more computing-related resources at the determined service-specific target resource location on behalf of the client, such as part of complying with the received request from the new client. In block 540, the routine optionally performs other tasks, such as to further perform other actions related to complying with the request of the new client.

If it was instead determined in block 525 that the resource provider service is not able to determine a service-specific target resource location to use that satisfies the constraint group, the routine continues instead to block 545. For example, the resource provider service may have one or more possible target resource locations to use that would satisfy the constraints of the constraint group, but those possible target resource locations are not among the one or more currently mapped target resource locations for the constraint group. Alternatively, the constraint group may specify a geographical area in which the resource provider service does not have access to use any resources that are needed to comply with the new client's request, and so is unable to comply with that request. In some such embodiments when the current resource provider service cannot comply with the client request, the resource provider service may merely fail (e.g., responding to the client request with an error or other indication of failure)—if so, the client may subsequently choose to modify the constraints and/or initiate a change in any mapped target resource locations for the constraint group (e.g., by interacting with one or more other resource provider services that are currently using resources on the client's behalf in those mapped target resource locations), and then re-submit the same request to the current resource provider service.

In the illustrated embodiment, however, the Client Resource Constraint Manager Service may provide functionality to facilitate a negotiation process between resource provider services to attempt to resolve situations in which the current resource provider service has one or more possible target resource locations that would satisfy the constraints of the constraint group, if a currently mapped target resource location for the constraint group was changed to include one or more of those other possible target resource locations. Accordingly, in block 545, the illustrated embodiment of the routine contacts the Client Resource Constraint Manager Service and attempts to obtain a resolution of such a new mapped target resource location for the constraint group, such as by supplying information to the Client Resource Constraint Manager Service that indicates the one or more possible target resource locations that the current resource provider service could successfully use in accordance with the constraints of the group. As previously noted, the Client Resource Constraint Manager Service may in some embodiments facilitate such negotiations by forwarding the received negotiation request onto one or more other resource provider services that currently use the constraint group, such as to allow those resource provider services to determine whether or not they are willing and able to change the mapped target resource locations for that constraint group to one of the possible target resource locations indicated by the client resource provider service. In other embodiments, the Client Resource Constraint Manager Service may instead respond to such a negotiation request by automatically determining whether or not to modify the mapped target resource locations for a constraint group (e.g., if other resource provider services were previously using resources at the currently mapped target resource locations in accordance with the constraint group, but are no longer doing so). In block 555, the routine receives a response to the negotiation resolution initiated in block 545 (e.g., after a period of time, such as while the routine 500 continues to perform other operations on behalf of this and/or other clients in an asynchronous manner). If a new target resource location mapping for the constraint group is successfully obtained, the routine continues from block 555 to block 535, and otherwise continues to block 560 to provide an error to the client that the client request cannot be satisfied in accordance with the current constraint group information. As previously noted, in other embodiments blocks 545 and 555 may not be performed, such as to continue directly from block 525 to block 560 if the determination in block 525 is unsuccessful.

If it was instead determined in block 510 that the received request was not a request from a new client related to resource usage, the routine continues to block 565 to determine whether to attempt to change a mapped target resource location for a constraint group for which one or more resources are being used for a client. For example, the routine may identify that the computing-related resources in a particular service-specific target resource location are over-utilized or under-utilized, and so may attempt to move resource usage for one or more clients from or to those locations, respectively. The determination to attempt to change a target resource location may arise in various ways in various embodiments, such as based on a periodic check (e.g., as triggered by expiration of a timer), by an alarm or other indication that is triggered based on an amount of use of computing-related resources at a particular resource location rising above or below a threshold, etc. If it is determined in block 565 to attempt to change a target resource location for a constraint group, the routine continues to block 567 to attempt to identify one or more new service-specific target resource locations that satisfy the constraints of a selected constraint group and that otherwise would be preferred by the current resource provider service over the current mapped target resource locations for the selected constraint group. In block 568, if one or more such new service-specific target resource locations are identified, the routine then contacts the Client Resource Constraint Manager Service and attempts to update the mapped target resource locations for the selected constraint group to the new identified service-specific target resource location. As previously noted, in some embodiments a particular resource provider service may be allowed to update a mapped target resource location for a constraint group in at least some situations (e.g., if the current resource provider service is the primary resource provider service for the constraint group, if the current resource provider service is the only or first resource provider service using the constraint group, etc.), while in other embodiments such an update is allowed only if agreed to by the Client Resource Constraint Manager Service and/or by other resource provider services (e.g., other resource provider services that are currently using resources on the client's behalf in accordance with the constraint group). After block 568, the routine then continues to 570 to determine whether the Client Resource Constraint Manager Service indicates a successful update of the mapped target resource location for the selected constraint group. If so, the routine continues in block 572 to initiate continuing and/or future use of resources on behalf of the client in accordance with the constraint group at the identified new service-specific target resource location (e.g., to move previously stored data for the client from the prior mapped target resource location to the identified new service-specific target resource location). If it is instead determined in block 570 that the attempt to change the target resource location for the selected constraint group was not successful, or if no new service-specific target resource locations are identified in block 567, the routine continues instead to block 585, where an error is optionally reported (e.g., if the determination to attempt to change the mapped target resource location was initiated in response to a request from a client or other user, such as to update that client or user of the inability to update the mapped location).

If it was instead determined in block 565 that the request was not an attempt to change the mapped target resource location for a constraint group, the routine continues instead to block 580 to perform one or more indicated operations as appropriate. For example, as previously noted, in at least some embodiments, a negotiation process between resource provider services and and/or with the Client Resource Constraint Manager Service may be performed, and if so such negotiation requests sent to the current resource provider service may be handled in block 580 (in a manner similar to that of block 567, such as to identify whether any service-specific target resource locations are available to the current service that satisfy an indicated constraint group and that are acceptable to the other party that initiated the negotiation). Furthermore, as previously noted, each resource provider service may perform various other service-specific operations (on behalf of clients or otherwise), and such operations may be handled in block 580.

After blocks 540, 560, 572, 580, or 585, the routine continues to block 595 to determine whether to continue. If so, the routine returns to block 505, and if not continues to block 599 and ends.

Those skilled in the art will appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:

in response to information provided by a client, storing, by one or more configured computing systems of a constraint manager network service, a defined group of one or more constraints that each specify a criterion for computing-related resources used on behalf of the client by other network services, the defined group including at least one constraint that specifies one or more geographical locations in which the computing-related resources are to be located;

associating, by the one or more configured computing systems, a reference with the defined group of one or more constraints;

receiving, by the one or more configured computing systems, a request from a first network service indicating the associated reference for information about the one or more constraints that correspond to the reference, and providing information about the one or more constraints to the first network service;

receiving, by the one or more configured computing systems, information from the first network service about one or more computing-related resources that are provided by the first network service for use on behalf of the client in a manner that satisfies the one or more constraints;

receiving, by the one or more configured computing systems and subsequent to the receiving of the information from the first network service, a request from a second network service indicating the associated reference for information about the one or more constraints that correspond to the reference, the second network service being distinct from the first network service; and providing information to the second network service about the one or more constraints and about the one or more computing-related resources provided by the first network service, the provided information enabling the second network service to use one or more other computing-related resources in a manner that satisfies the one or more constraints and that is based at least in part on the one or more computing-related resources.

2. The method of claim 1 wherein the receiving of the request from the first network service and the receiving of the information from the first network service each includes receiving one or more electronic communications transmitted from the first network service over one or more networks, and wherein the receiving of the request from the second network service includes receiving one or more additional electronic communications transmitted from the second network service over at least one network.

3. The method of claim 1 wherein the one or more computing-related resources are provided by the first network service at a first geographical location that is one of the specified one or more geographical locations; and wherein the providing of the information to the second network service includes providing an indication to the second network service of the first geographical location, so that the second network service is enabled to use the one or more other computing-related resources at a selected geographical location that satisfies the defined group of one or more constraints and that is based on the first geographical location.

4. The method of claim 1 wherein the one or more computing-related resources provided by the first network service are part of a first group of one or more computing systems that satisfy the defined group of one or more constraints; and wherein the providing of the information to the second network service includes providing an indication to the second network service of the first group of one or more computing systems, so that the second network service is enabled to use the one or more other computing-related resources by interacting with the one or more computing systems of the first group.

5. The method of claim 1 further comprising:

identifying one or more computing systems that satisfy the one or more constraints of the defined group; and associating the identified computing systems with the defined group such that the use by the first network service of the one or more computing-related resources is performed based on interactions of the first network service with at least one of the identified computing systems, and such that the second network service is enabled to use the one or more other computing-related resources based on interactions of the second network service with at least one of the identified computing systems.

6. The method of claim 5 wherein the identified one or more computing systems are selected based at least in part on being located in at least one geographical location that is identified as satisfying the at least one constraint, and wherein the associating of the identified computing systems with the defined group includes mapping the defined group to the identified at least one geographical location, such that the use by the first network service of the one or more computing-related resources is performed in the at least one identified geographical location, and such that the second network service is enabled to use the one or more other computing-related resources in the at least one identified geographical location.

7. The method of claim 6 wherein the at least one identified geographical location to which the defined group is mapped is not identified to the client.

8. The method of claim 5 wherein the identifying of the one or more computing systems is based at least in part on information provided by at least one of the first and second network services, and wherein the identified one or more computing systems include multiple computing systems that are available at one or more identified data centers.

9. The method of claim 1 wherein the specified one or more geographical locations include at least one of a group that includes a geographical area with government-specified boundaries, a geographical area to which an indicated law applies, a geographical area to which an indicated tax applies, a degree of proximity to an indicated geographical location, a degree of geographical proximity between multiple computing-related resources, and a degree of geographical proximity to an indicated entity.

10. The method of claim 1 wherein the one or more constraints of the defined group further include an indication of a degree of fault tolerance, and wherein the degree of fault tolerance is based on at least one of a group including a degree of proximity between two or more computing-related resources, a degree of proximity of one or more computing-related resources to an indicated geographical location, a type of computer hardware used to provide at least one of the computing-related resources, and a type of software used to provide at least one of the computing-related resources.

11. The method of claim 1 wherein at least one of the one or more constraints of the defined group indicate a level of one or more operational characteristics of use of one or more types of computing-related resources, and wherein the method further comprises determining at least one of a computing-related resource and of a geographical location of computing-related resources that will provide the indicated level of the one or more operational characteristics.

12. The method of claim 1 wherein at least one of the one or more constraints of the defined group is specific to the first network service, such that the use of the one or more computing-related resources by the first network service on behalf of the client is performed in accordance with the at least one constraint, and such that the second network service does not use the one or more other computing-related resources on behalf of the client in accordance with the at least one constraint.

13. The method of claim 1 wherein at least one other of the constraints of the defined group is a conditional constraint that is applicable only when current conditions satisfy indicated criteria for the at least one other constraint, such that the use of the one or more computing-related resources by the first network service on behalf of the client is performed in accordance with the at least one other constraint based on current conditions at a time of the use of the one or more computing-related resources, and such that the second network service does not use the one or more other computing-related resources on behalf of the client in accordance with the at least one other constraint based on differing current conditions at a time of the use of the one or more other computing-related resources.

14. The method of claim 1 wherein the use of the one or more computing-related resources by the first network service on behalf of the client includes at least one of a group including persistently storing data on one or more persistent storage mediums, temporarily storing data in volatile memory, using one or more processors for execution of one or more programs, using a defined amount of network bandwidth, using an input device, using an output device, providing message queuing capabilities, and providing communication forwarding capabilities.

15. The method of claim 1 wherein the one or more constraints of the defined group indicate at least one proximity-based relationship to another defined group of one or more constraints, such that use of computing-related resources in accordance with the defined group of constraints for the client will occur at a degree of proximity to use of other computing-related resources in accordance with the another defined group of constraints that satisfies the at least one proximity-based relationship.

16. The method of claim 15 wherein the another defined group of constraints includes constraints specified by another client for use in controlling use of computing-related resources on behalf of the another client.

17. The method of claim 1 wherein the defined group of one or more constraints includes multiple constraints, wherein the defining of the group of one or more constraints includes receiving an indication from the client of another defined group of one or more constraints and of one or more additional constraints, such that the multiple constraints of the defined group include the one or more constraints of the indicated another defined group and include the one or more additional constraints indicated by the client.

18. The method of claim 1 wherein the first and second network services are resource provider services that are unaffiliated with each other and with the constraint manager network service, and wherein the client and the first and second network services are remote from the one or more computing systems such that communications by the constraint manager network service with the client and with the first and second network services occur over one or more networks.

19. A computing system configured to manage constraints related to use of computing-related resources, comprising:
one or more processors; and
a constraint manager system that is configured to, when executed by at least one of the one or more processors, manage resource usage constraints for clients by, for each of multiple clients:
defining a group of one or more constraints to control use of computing-related resources for the client by services external to the client, at least one of the one or more constraints indicating one or more geographical areas for use of the computing-related resources;
associating with the defined group one or more geographical locations that are identified as satisfying the one or more constraints of the defined group; and
for each of one or more of multiple services external to the client that are unaffiliated with each other, providing information about the defined group of one or more constraints to the service so that the service is enabled to use one or more computing-related resources for the client in a manner that satisfies the defined group of one or more constraints and that is performed relative to use of other computing-related resources by other of the multiple services, the provided information including the associated one or more geographical locations such that the enabled use of the one or more computing-related resources by the service for the client occurs in at least one of the associated geographical locations.

20. The computing system of claim 19 wherein the multiple services for one of the clients include multiple network services that each use one or more distinct computing-related resources on behalf of the one client, wherein the one or more geographical locations associated with the defined group for the one client are identified based at least in part on information provided by at least one of the multiple network services, and wherein the associating of the one or more geographical locations with the defined group for the one client includes mapping the defined group for the one client to the one or more geographical locations.

21. The computing system of claim 19 wherein the constraint manager system includes software instructions for execution by the computing system.

22. The computing system of claim 19 wherein the constraint manager system consists of a means for managing constraints for clients by, for each of multiple clients:
defining a group of one or more constraints to control use of computing-related resources for the client by services external to the client, at least one of the one or more constraints indicating one or more geographical areas;
associating with the defined group one or more geographical locations that are identified as satisfying the one or more constraints of the defined group; and
for each of one or more services external to the client, providing information about the defined group of one or more constraints to the service so that the service is enabled to use one or more computing-related resources for the client in a manner that satisfies the defined group of one or more constraints, the provided information including the associated one or more geographical locations such that the enabled use of the one or more computing-related resources by the service for the client occurs in at least one of the associated geographical locations.

23. A non-transitory computer-readable medium whose contents configure a computing device to manage constraints related to use of computing-related resources, by performing a method comprising:
in response to information provided by a client, defining a group of one or more constraints, the one or more constraints of the defined group identifying one or more associated geographical location in which a network service is able to use computing-related resources on behalf of the client in a manner that satisfies the one or more constraints of the defined group;
providing information to a first network service about the defined group of one or more constraints and about the associated one or more geographical locations, so that the first network service uses one or more computing-related resources for the client in at least one of the associated one or more geographical locations and in a manner that satisfies the defined group of one or more constraints; and
providing information to a second network service about the defined group of one or more constraints and about the associated one or more geographical locations, such that the second network service may use one or more other computing-related resources for the client in a manner that satisfies the defined group of one or more constraints and that is based at least in part on the at least one associated geographical location at which the first network service uses the one or more computing-related resources.

24. The non-transitory computer-readable medium of claim 23 wherein the method is performed under control of a constraint manager service provided by the configured computing device, wherein the identified one or more geographical locations are a subset of multiple geographical locations satisfying the one or more constraints and are identified based at least in part on information provided by the first network service, and wherein the associating of the identified one or more geographical locations with the defined group includes mapping the defined group to the identified geographical locations of the subset.

25. The non-transitory computer-readable medium of claim 23 wherein the computer-readable medium is a memory of the configured computing device, and wherein the contents are instructions that when executed program the configured computing device to perform the method.

* * * * *

UNITED STATES PATENT AND TRADEMARK OFFICE
CERTIFICATE OF CORRECTION

PATENT NO. : 8,954,592 B1  
APPLICATION NO. : 11/963590  
DATED : February 10, 2015  
INVENTOR(S) : Cormie et al.

It is certified that error appears in the above-identified patent and that said Letters Patent is hereby corrected as shown below:

In the claims

Column 30, Line 22, Claim 23:
"associated geographical location in which a network" should read, --associated geographical locations in which a network--.

Signed and Sealed this
Twenty-second Day of March, 2016

Michelle K. Lee
*Director of the United States Patent and Trademark Office*